United States Patent [19]

McWilliams et al.

[11] Patent Number: 5,211,356
[45] Date of Patent: May 18, 1993

[54] METHOD AND APPARATUS FOR REJECTING TRACKABLE SUBIMAGES

[75] Inventors: Joel K. McWilliams, Highland Village; Don R. Van Rheeden, Lewisville, both of Tex.

[73] Assignee: Texas Instruments Incorporated, Dallas, Tex.

[21] Appl. No.: 753,294

[22] Filed: Aug. 30, 1991

[51] Int. Cl.⁵ .............................................. F41G 7/22
[52] U.S. Cl. ................................... 244/3.15; 244/3.16
[58] Field of Search ...................... 244/3.15, 3.16, 3.17

[56] References Cited

U.S. PATENT DOCUMENTS

| | | | |
|---|---|---|---|
| 3,912,198 | 10/1975 | Dell et al. | 244/3.16 |
| 4,133,004 | 1/1979 | Fitts | 244/3.16 |
| 4,476,494 | 10/1984 | Tugaye | 244/3.17 |

*Primary Examiner*—Charles T. Jordan
*Attorney, Agent, or Firm*—René E. Grossman; Richard L. Donaldson

[57] ABSTRACT

A method for rejecting inaccurate subimages is disclosed for subimages used to track an aimpoint. The difference between the actual location of each subimage and the location of the subimage based on an estimated aimpoint is compared to a threshold value. The subimage is discarded if the difference exceeds the threshold value. The aimpoint may then be reestimated using the revised set of subimages.

14 Claims, 4 Drawing Sheets

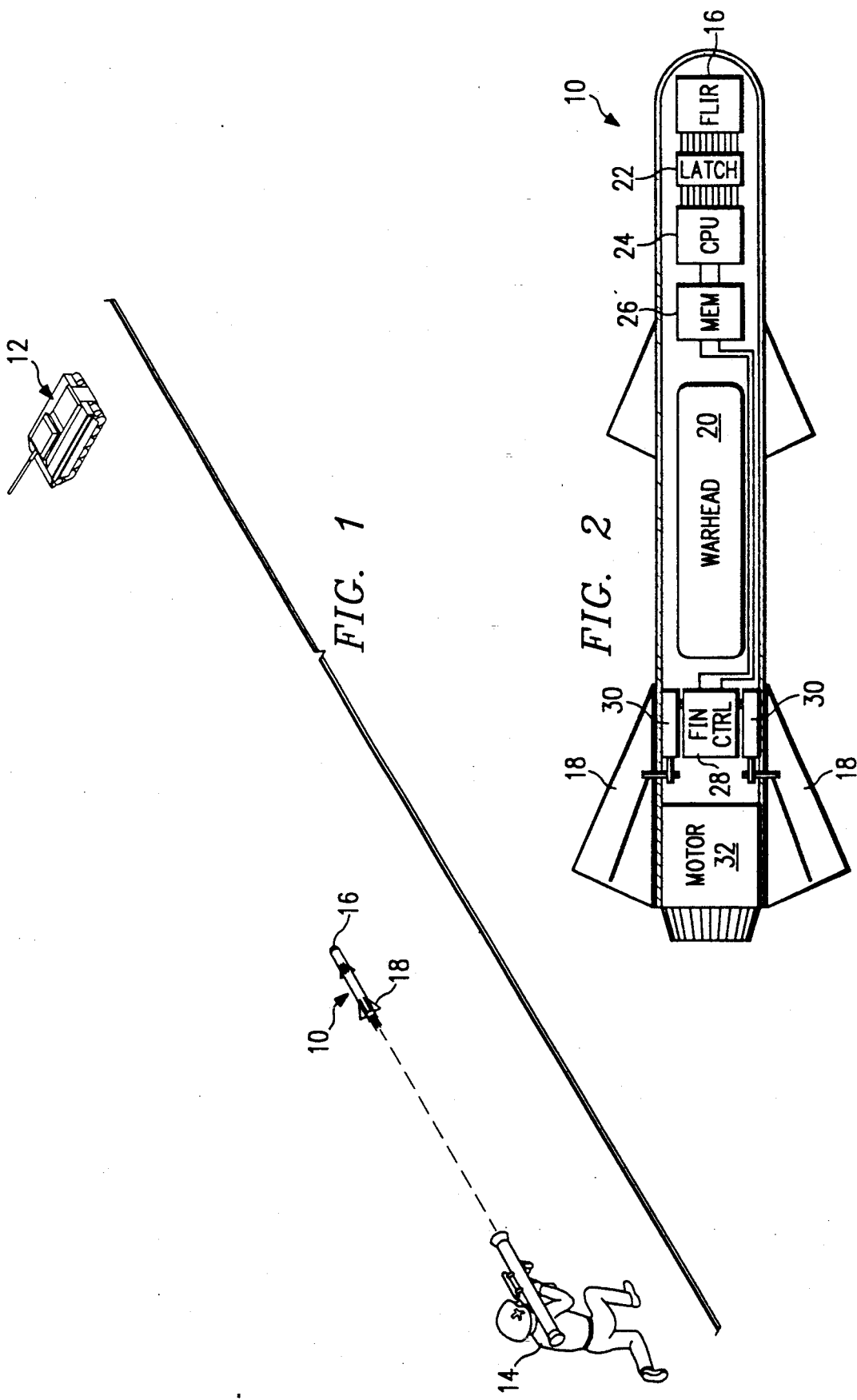

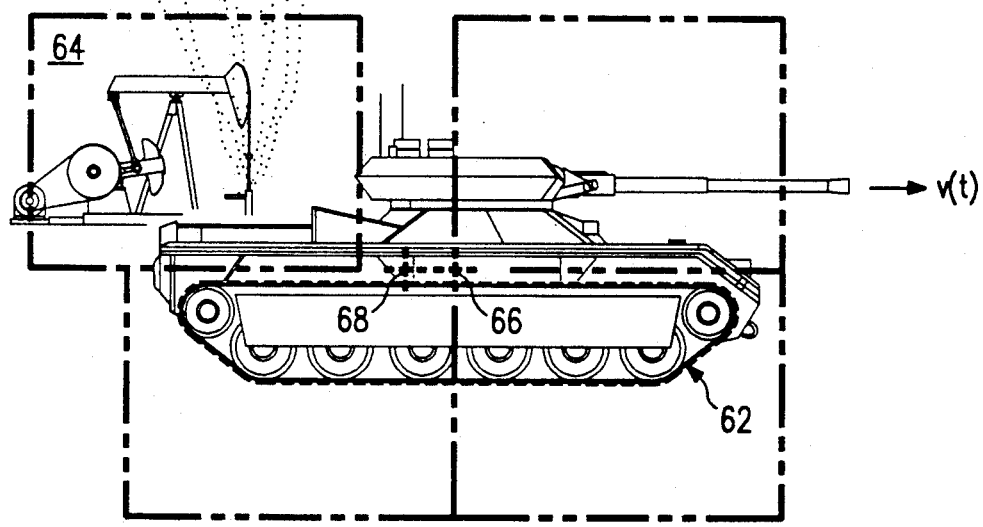
FIG. 8
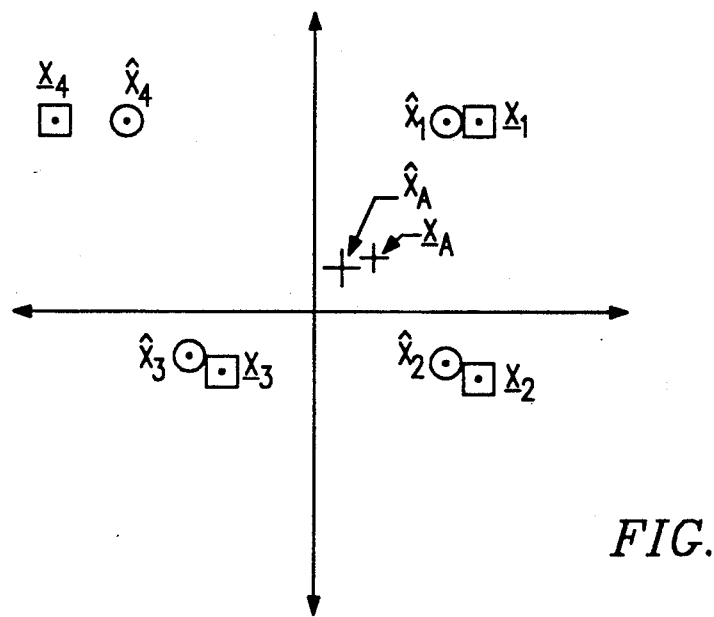
FIG. 9

METHOD AND APPARATUS FOR REJECTING TRACKABLE SUBIMAGES

RELATED APPLICATIONS

This Application is related to U.S. patent application Ser. No. 07/752,740, filed Aug. 30, 1991, entitled "Method and Apparatus for Tracking an Aimpoint on an Elongate Structure" and is incorporated by reference herein.

This Application is related to U.S. patent application Ser. No. 07/753,151, filed Aug. 30, 1991, entitled "Method for Tracking an Aimpoint with Arbitrary Subimages", and is incorporated by reference herein.

TECHNICAL FIELD OF THE INVENTION

This invention relates to computer control and more particularly to a method of rejecting subimages associated with the aimpoint of a target.

BACKGROUND OF INVENTION

In certain computer control applications, it is necessary to track and measure the image of an object passively. It is especially important in weapons delivery systems that a target be so tracked. If such a target were tracked actively (i.e., using radar or laser range finding techniques), the target might detect the presence of the tracker. Once the target has detected the presence of the tracker, it can respond in one of several ways, all of which are deleterious to the tracker. For instance, the target might "jam" the tracker by bombarding it with signals that are comparable to those which the tracker is actively using or the target might fire its own weapon at the tracker, at the source of the tracking signal, or, even at the launching site of the tracker. In this way, the target could defeat the tracker, destroy the tracker or perhaps even destroy the launch site of the tracker, including the operating personnel.

Passively tracking a target, however, imposes at least one serious limitation on the tracker. A tracker cannot accurately determine the distance or "range" to a target if it cannot actively sense the object. An active tracker, for instance, could determine the distance to a target by measuring the elapsed time from the emission of a radio frequency signal to the receipt of the signal reflected off of the target. The absence of a range measurement from tracker to target limits the passive tracker's ability to compensate for the apparent change in target image as the tracker moves in relationship to the target. Without this ability, a tracker will fail to maintain a constant target.

In practice, a tracker benefits by tracking several subimages of its target's image. These subimages are two dimensional representations of structures that are physically related to the exact target location or "aimpoint" in the real three-dimensional world. Multiple subimages are used for redundancy purposes and because the actual aimpoint of the target is often untrackable due to low image contrast, brightness, or other reasons. As the tracker nears the target, however, the subimages will appear to radiate outwardly with respect to each other. The position of the subimages with respect to one another may also change in other ways in certain situations. For instance, two subimages located on a target may appear to approach one another if they are located on a face of a target that is rotating away from the tracker. A tracker targeting an elongated structure such as a runway or tall building will sense complex subimage motion due to closure of the tracker on the target. These subimages will appear to move at rates that are dependent on their location within the tracker's field of view. The tracker motion can be further complicated by background subimages erroneously tracked by the tracker. A tracker will then mislocate the aimpoint and, perhaps, completely miss its target if it cannot identify and compensate for "bad" subimages.

Prior attempts to passively track an object have resulted in solutions with limited flexibility and poor accuracy. Heretofore, an object once identified as an aimpoint was tracked by tracking a predetermined number of subimages in a known pattern. Typically, the pattern chosen was a square with the aimpoint at its center and four subimages located at the four corners of the square. That system would track the four subimages located at the corners of the square and infer the actual aimpoint using the simple symmetry of the predetermined square. This method faltered when the geometry of the actual target resulted in less than four suitable subimages located in the requisite pattern or when the subimage selected was not associated with the aimpoint. This system lacked the ability to identify bad subimages.

Therefore, a need has arisen for a passive subimage tracker which is able to determine if a selected subimage is behaving as though it were a subimage of an object physically related to the aimpoint.

SUMMARY OF THE INVENTION

In accordance with the present invention, a method for rejecting a subimage associated with an aimpoint is provided which substantially eliminates or reduces disadvantages and problems associated with prior trackers.

A method for rejecting at least one of a set of subimages associated with an aimpoint is disclosed comprising the steps of calculating a difference between two sets of the location parameters for a set of subimages and comparing the difference to a threshold value. A subimage in the set is rejected if its difference exceeds a certain value. The first set used in the comparison is an estimated location of the subimages based on the estimated location of the estimated aimpoint. The second set is the measured location of the subimages. The comparison is made for each tracked subimage.

It is a first technical advantage of the invention that an aimpoint tracker can reject subimages which yield poor results. Typically, these subimages yield such results because they represent image clutter which is not physically associated with the target. This improves the future confidence of aimpoint calculations.

A second technical advantage of the invention is its ability to redetermine the aimpoint based on an adjusted set of subimages. The adjusted set of subimages includes only those subimages which behave as though they are connected to the aimpoint in the real world. This improves the immediate confidence of aimpoint calculations.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a perspective schematic view of an antiarmor "fire and forget" missile system which may advantageously incorporate the disclosed invention;

FIG. 2 is a part schematic part cross-sectional diagram of the anti-armor missile of FIG. 1;

FIG. 8 depicts a target being tracked by four subimages;

FIG. 9 mathematically depicts the target of FIG. 3 in a two-dimensional coordinate system.

DETAILED DESCRIPTION OF THE INVENTION

Figure 3:
FIG. 3 is a half-tone replication of a digitized image of the target at a certain time as seen by the "fire and forget" missile depicted in FIG. 1.

The preferred embodiment of the present invention and its advantages are best understood by referring to FIGS. 1-10 of the drawings, like numerals being used for like and corresponding parts of the various drawings.

FIG. 1 depicts an anti-armor "fire and forget" missile system which incorporates the disclosed invention. A missile 10 is fired at a target 12 by an infantryman 14. Infantryman 14 selects an aimpoint on the target 12 that he believes will offer the least resistance to missile 10 upon impact. Missile 10 incorporates a passive imaging sensor 16 and a processor (not shown) for acquiring and digitizing an image. Missile 10 also has movable fins 18 which are controlled by the processor to vary the direction of the missile. Missile 10 acquires trackable subimages related to the particular aimpoint selected by infantryman 14 which are within the field of view of the sensor 16. Missile 10 computes an initial geometric relationship between the aimpoint and the initial subimages and retains this in an onboard memory (not shown). Missile 10 periodically reacquires the subimages and computes a new aimpoint as will be more fully described below. Missile 10 may then adjust its path to intercept target 12 despite subsequent movement of the target 12 relative to infantryman 14 or missile 10.

The type of missile depicted in FIG. 1 is known as a "fire and forget" missile because infantryman 14 may forget the missile after launch and seek cover or engage other targets of opportunity. Missile 10, however, will continue to track and intercept target 12. Missile 10 may select subimages based on any number of criteria including, but not limited to, the "hot spot" and "correlator" methods. In the "hot spot" method, a sensor identifies subimages according to the hottest (brightest or warmest) spot within a specified region. In the correlator method, the tracker searches for a previously identified geometric pattern.

FIG. 2 depicts "fire and forget" missile 10 which may incorporate the disclosed invention. Missile 10 delivers a warhead 20 which detonates upon impact with target 12 (FIG. 1). The missile 10 contains an onboard sensor 16 such as a forward looking infrared camera ("FLIR"), that is sensitive to radiation emitted by the missile's target. A latch 22 temporarily saves the information received by sensor 16 so that it is more accessible by a central processing unit ("CPU") 24. CPU 24 might itself comprise various subsystems (not shown) which may be implemented by hardware or software, including an aimpoint designator for initially establishing the aimpoint on the target, a normalized distance calculator for calculating the distance between each subimage and the aimpoint, and a comparator for comparing the actual and estimated subimage locations and for rejecting those subimages that fail a certain statistical test.

CPU 24 periodically acquires images within its field of view during the operation of missile 10. CPU 24 has associated with it a memory 26. Memory 26 contains the routines which CPU 24 runs and stores data necessary to the disclosed invention. CPU 24 controls the direction of missile 10 through a fin control unit 28. Fin control unit 28 manipulates each fin 18 through, for example, a servo 30. Missile 10 is propelled by a rocket motor 32.

FIG. 3 depicts a view of target 12 by sensor 16 of missile 10. The aimpoint, as originally specified by infantryman 14, is indicated by a crosshairs. In this particular embodiment, missile 10 has an infrared sensor. The engine compartment and wheel bearings of target 12, being hottest, are therefore indicated by the color white. Cooler structures such as the background are indicated by shades of grey and by black.

Figure 4:
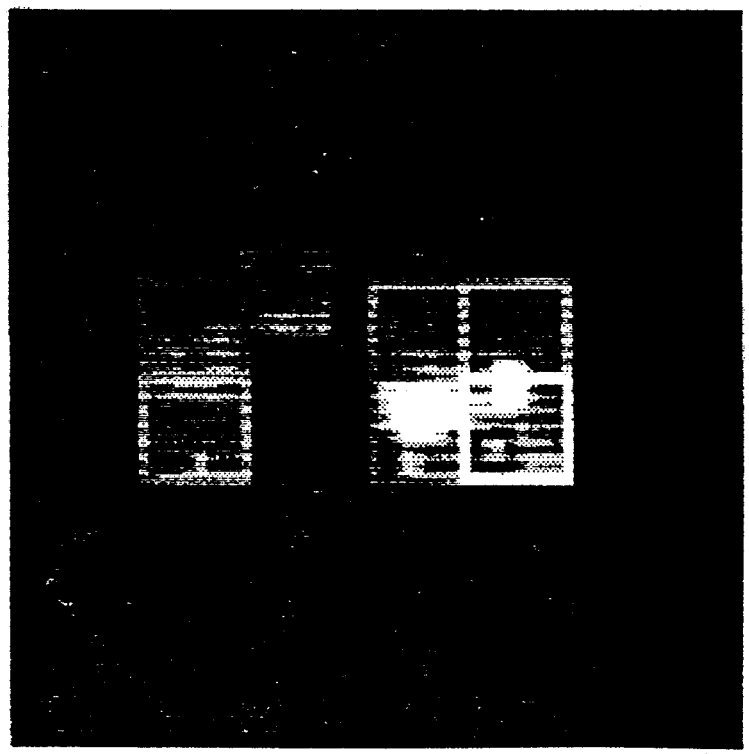
FIG. 4 depicts trackable subimages associated with the target depicted in FIG. 1 at the time corresponding to the time of FIG. 3.

FIG. 4 depicts certain trackable subimages contained in FIG. 3. Each trackable subimage is identified as a small square. All other areas are blocked from view. A tracker on board missile 10 initially selects a number of these subimages to track the target at an initial time. The tracker also calculates a normalized distance between the aimpoint selected by the infantryman 14 and each subimage. This distance may be the actual number of pixels between the aimpoint and the subimage as sensed by the tracker. The distance may be further normalized so that at least one subimage is a certain distance, such as "1", away from the aimpoint. These dimensions are saved for future use by the tracker.

Figure 5:
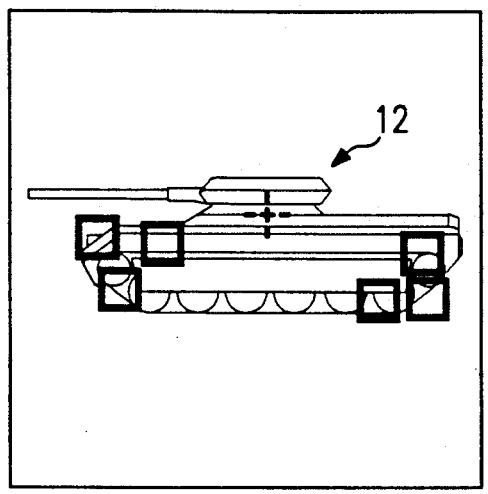
FIGS. 5 and 6 are schematic elevational views depicting the image and trackable subimages of the target from FIG. 1 at a first time and at a subsequent time, respectively.
Figure 6:
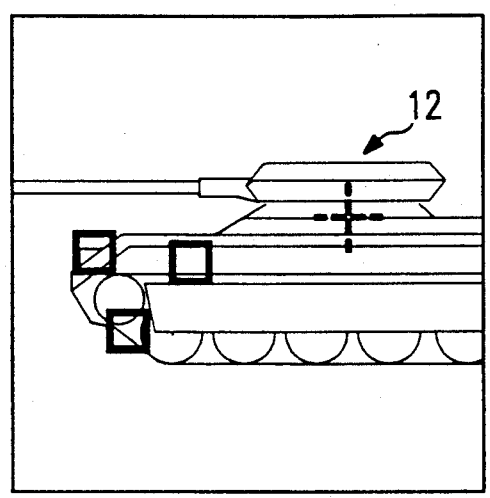

FIG. 5 depicts a view of target 12 and six trackable subimages superimposed thereon. FIG. 6 depicts the view of target 12 and the trackable subimages as depicted in FIG. 5 at a slightly later time. The image of target 12 appears to grow in size as the missile 10 (FIGS. 1 and 2) closes in on target 12. As a consequence, the subimages depicted also appear to grow in size and to move radially outward from the aimpoint. Three subimages, initially at the right side of FIG. 5, are no longer visible in the field of view. The tracker will typically adjust its course to maintain the aimpoint (crosshairs) in the center of its field of view. This apparent movement of the subimages relative to the aimpoint and the loss of some subimages must be accounted for by the tracker to insure successful guidance of missile 10 to target 12.

The approach to multiple subimage tracking without range estimates is based on a generalized geometric model. This model is based on the fact that though the target and thus the subimages will be growing in the image during closure to the target, the relative dimensions of the target do not change. This assumes that the angle of attack between the tracker and target stays fairly constant, which is common during most of the terminal phase of the missile flight.

In the generalized geometric approach each tracker location is related to the aimpoint location using a normalized coordinate frame. An individual subimage i at image location $(x_i, y_i)$ can be related to the aimpoint A at image location $(x_A, y_A)$ by the following equations:

$$x_i = x_A + \delta x_i + n_{xi}$$

$$y_i = y_A + \delta y_i + n_{yi}$$

where $(\delta x_i, \delta y_i)$ represents the offset in the image plane of subimage i from the aimpoint A, and $(n_{xi}, n_{yi})$ are additive noise terms which corrupt measurement of the true subimage locations. These equations can be combined into a single equation using vector notation:

$$\underline{x} = \underline{x}_A + \underline{\delta x} + \underline{n}$$

The key to accurately modeling each subimage position is the accurate representation of the offset vector. The offset vector may be expressed as:

$$\begin{bmatrix} \delta x_i \\ \delta y_i \end{bmatrix} = \begin{bmatrix} s_x d_{xi} \\ s_y d_{yi} \end{bmatrix}$$

where $(s_x, s_y)$ are the target image magnification factors ("TIMFs") and $(d_{xi}, d_{yi})$ are the size normalized distances between subimage i and the aimpoint A. By using two magnification factors, the tracker can mathematically compensate for the rotation of a target. Thus $(d_{xi}, d_{yi})$ are range independent normalized distances. Although size is typically chosen as the normalization factor because it is a measurable quantity of the target, any scaling factor can be used. This offset vector leads to the matrix representation:

$$\begin{bmatrix} x_i \\ y_i \end{bmatrix} = \begin{bmatrix} 1 & d_{xi} & 0 & 0 \\ 0 & 0 & 1 & d_{yi} \end{bmatrix} \begin{bmatrix} x_A \\ s_x \\ y_A \\ s_y \end{bmatrix} + \begin{bmatrix} n_{xi} \\ n_{yi} \end{bmatrix}$$

for a single subimage i, and $$\begin{bmatrix} x_1 \\ \vdots \\ x_N \\ y_1 \\ \vdots \\ y_N \end{bmatrix} = \begin{bmatrix} 1 & d_{x1} & 0 & 0 \\ \vdots & \vdots & & \\ 1 & d_{xN} & 0 & 0 \\ 0 & 0 & 1 & d_{y1} \\ \vdots & & \vdots & \\ 0 & 0 & 1 & d_{yN} \end{bmatrix} \begin{bmatrix} x_A \\ s_x \\ y_A \\ s_y \end{bmatrix} + \begin{bmatrix} n_{x1} \\ \vdots \\ n_{xN} \\ n_{y1} \\ \vdots \\ n_{yN} \end{bmatrix}$$

for N subimages.

The previous expression may be more conveniently written as $$\underline{x} = H\theta + \underline{n}$$

where $$\theta = [x_A s_x y_A s_y]^T$$

and H is a 2N×4 matrix of "1"s, "0"s, and normalized distances as depicted above. At each successive time the tracker reacquires the subimages, all variables are known except those in $\theta$ and in the noise vector n.

The vector $\theta$ and hence the aimpoint may be estimated by several techniques including a least squares technique where $$\hat{\theta} = (H^T H)^{-1} H^T \underline{x}$$

where $\hat{\theta}$ is an estimate $\theta$. This method will minimize the effect of the noise vector n.

The generalized geometric approach may be modified to use a single magnification factor s. In such a case $\theta$ would be a 3×1 matrix and H would be 2N×3 matrix. This modified H matrix would have the normalized dimensions in a single column.

Figure 7:
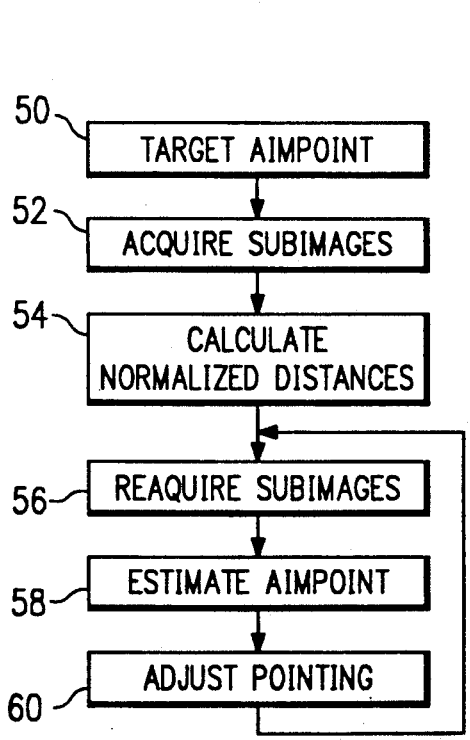
FIG. 7 depicts a flow chart of a subimage tracker according to one embodiment of the disclosed invention.

FIG. 7 depicts a flow chart of a subimage tracker that incorporates the generalized geometric approach. An aimpoint is initially acquired on the target in block 50 by an operator. The tracker then acquires multiple subimages associated with the chosen aimpoint according to internal criteria such as image contrast or image brightness in block 52. The tracker calculates the normalized distances between each subimage that it has acquired and the selected aimpoint in block 54. These distances are stored in a matrix whose particular form is described above. In blocks 56 and 58, the tracker reacquires the subimages and estimates the location of the aimpoint from the previously calculated normalized distances using the mathematical model described above. If the missile is closing on the target, some of the original subimages may leave the field of view of the sensor. Meanwhile, new trackable subimages may be found as target details appear. These new subimage locations may be added to the matrix of subimage locations, typically in block 56, as needed. The tracker may then adjust sensor pointing, block 60, to maintain the aimpoint at the center of its field of view. The final three steps depicted in FIG. 7 are repeated until the missile impacts its target or the tracker otherwise ends its program. It should be understood that block 60 may comprise any number of related steps such as issuing commands to an operator to follow the aimpoint or displaying a crosshairs to pinpoint the location of the aimpoint in a display. The tracker may also be mounted in a stationary environment where it simply follows an aimpoint in its field of view without actively pursuing the target.

FIG. 8 is an elevational view of a targeted tank in which the tank 62 is moving from left to right with a velocity v(t). A trackable clutter object 64 in the upper left correlator (indicated by the burning oil well pump) will introduce a bias into the original aimpoint 66. If the clutter happens to be more trackable than the upper left edges of the tank, the aimpoint will slide toward the back of the tank (indicated by the cross 68). As the aimpoint slides, a higher percentage of clutter will be incorporated into future correlation reference snapshots to the exclusion of subimages of the target. Eventually, the aimpoint may be off the target altogether. The rate of sliding is a function of target velocity, the amount of clutter in any one tracker subimage, and the infrared ("IR") strength of the clutter relative to the target if the tracker is IR sensitive. The same scenario will occur if, instead of using four correlator groups as depicted, any number of arbitrary subimages were employed.

The reason why the aimpoint can slide in scenarios like FIG. 8 is that the aimpoint is computed by assuming that all the individual subimages have the same magnification around the aimpoint. If the magnification of one or more subimages are bad, then the magnification errors will bias the aimpoint. If the bad subimage tracker can be detected and removed, the aimpoint may be recomputed based on the positions of the remaining good subimages.

Bad subimages may be detected by looking for large differences between the measured subimage location x and the estimated measurement x:

$$\delta \underline{x} = \underline{x} - \hat{\underline{x}}$$

Each estimated subimage location is determined from the estimated aimpoint. Typically this is accomplished by adding the product of an estimated magnification factor and the normalized offset vector to the estimated location of the aimpoint. The estimated aimpoint is itself determined by the location of all subimages, both good and bad, as described above.

FIG. 9 depicts the location of the measurements and the estimated measurements in a scenario such as FIG. 8. The measured locations of the subimages, $x_1, x_2, x_3,$ and $x_4$ are indicated by squared points while the estimated measurements, $\hat{x}_1, \hat{x}_2, \hat{x}_3,$ and $\hat{x}_4$ are indicated by circled points. The estimated and true aimpoints are indicated by $\hat{x}_A$ and $X_A$ respectively. Here, the residual, or error, of the upper left subimage $x_4 - \hat{x}_4$ is larger and of a different direction compared to the other three subimages. A robust statistical procedure may be used to detect the drift where:

$$M = \text{median } (\delta x_i), \quad i = 1, 2, \ldots N$$
$$MAD = \text{median } (|\delta x_i - M|), \quad i = 1, 2, \ldots N$$

MAD stands for the median absolute deviation. Other mathematical differences may also be used to test the behavior of each subimage.

The MAD is a robust estimator of the scale or spread of a distribution of values. The ratio MAD/0.6745 approaches the standard deviation for a Gaussian distribution as N becomes large. A robust T-test may be used of the form:

$$T_i = \sqrt{\frac{(\delta x_i - M)^2}{(MAD/0.6745)^2}}, \quad i = 1, 2, \ldots N$$

If $T_i$ is greater than a predetermined displacement threshold, then the tracker measurement is considered bad and is deleted. The $T_i$ statistic will not be corrupted by bad subimages as long as the majority of the trackers are good. The test is performed for both the x and y image dimensions.

The robust T-test would eventually detect and reject the bad subimage of FIGS. 8 and 9. By recomputing the aimpoint and magnification estimates using a subset of the subimages of only the good measurements, the reestimated aimpoint will be much closer to the true aimpoint.

Figure 10:
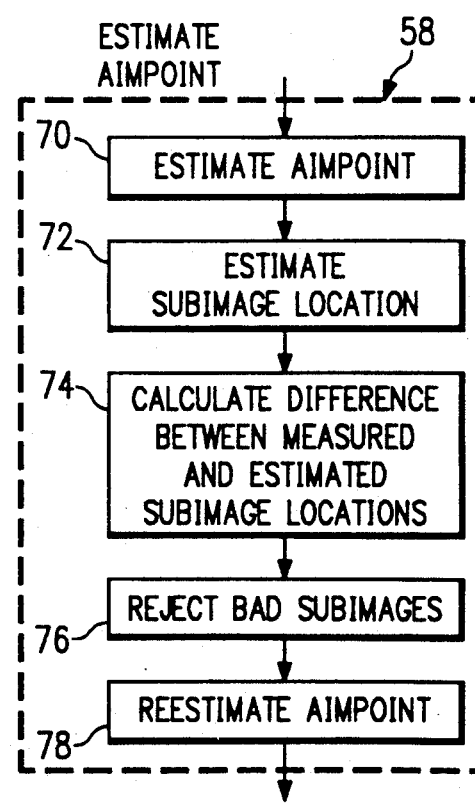
FIG. 10 depicts a flow chart of the disclosed invention.

FIG. 10 depicts the steps described above and is a detailed diagram of step 58 of FIG. 7. An aimpoint is estimated in block 70 initially using all subimages available to the tracker at a certain time. In block 72, each subimage location is estimated using the aimpoint estimate of block 70. This calculation may typically be accomplished by adding the product of a range normalized distance and magnification factor or factors (TIMF) to the aimpoint location. Each subimage has a range normalized distance that relates its location to the location of the aimpoint. A difference is calculated in block 74 between the estimated subimage location from block 72 and the measured location of each subimage in block 56 (FIG. 7). This difference is then statistically compared to a threshold value in block 76. If the difference exceeds the threshold value, then the subimage is rejected and deleted from the memory or database containing all of the subimages. In block 78, a new aimpoint is calculated using the revised aimpoint database.

Appendices A-G contain FORTRAN computer code for disclosing one embodiment of the disclosed invention. In particular, Appendix A discloses subroutine TRKNORNG2D for computing the aimpoint location using a single magnification model. Appendix B discloses subroutine TRKNORNG for computing the location of the aimpoint using the dual magnification model discussed above. Appendix C discloses Subroutine INTJITTER for rejecting bad subimages associated with an aimpoint under the subroutine TRKNORNG2D. Appendix D discloses subroutine JITTER for rejecting bad subimages associated with an aimpoint under the subroutine TRKNORNG. Appendix E discloses Subroutine LEASTSQ for calculating the least-squares estimate of a parameter vector. Appendix F discloses the common block variable declarations TKPTPARM and PROCPARM for the previous subroutines. Appendix G discloses a library of subroutines useful primarily for matrix math called by subroutines TRKNORNG, TRKNORNG2D, INTJITTER, JITTER and LEASTSQ.

```
C     NOTICE: "COPYRIGHT 1991, (TEXAS INSTRUMENTS, INC.) A portion of
C     the disclosure of this patent document contains material which is subject
C.    to copyright protection. The copyright owner has no objection to the
C     facsimile reproduction by anyone of the patent document or the patent
C     disclosure, as it appears in the Patent and Trademark Office patent file
C     or records, but otherwise reserves all copyright rights whatever."
C
C
C                              Section A
C
C                            Texas Instruments
C.                         T I   I N T E R N A L   D A T A
C                         Property of Texas Instruments ONLY
C
C
```

```
C     SUBROUTINE TRKNORNG2D
C
C
C     NAME:           TRKNORNG2D
C
C     FUNCTION:       Computes the aimpoint and trackpoint when no range
C                     estimates are available.  A least-square estimator
C                     calculates aimpoint and target magnification by
C                     assuming magnification is the same in each dimension.
C                     A single magnification factor is used.
C
C     DESCRIPTION:
C
C             Initialize the trackpoint measurement variances, the number of good
C                     trackers, and the standard deviation for one tracker
C             Set the tracker mode to locked on and the breaklock flag to false
C
C             Do for all trackers
C                     If a tracker is active and is at least one cycle old Then
C                             Assign model matrices and observation vectors used to
C                                compute least-squares target aimpoint and size estimates
C                             If weight trackers by distance from the aimpoint Then
C                                     Assign X distance weights
C                                     Assign Y distance weights
C                             Else
C                                     Assign all weights to unity
C                             End of If weight trackers by distance from the aimpoint
C                             Increment the number of trackers counter
C                     Else this tracker is not active or at least one cycle old
C                             Zero the least-squares weights for this tracker
C                     End of If a tracker is active and at least 1 cycle old
C             End of Do for all trackers
C
C             If there are at least two valid trackers Then
C                     Use least-squares to estimate aimpoint location and target size
C                     Run the jitter test to delete trackers with bad measurements
C                     Recompute the estimated trackpoint location and target size
C                             after removing the bad measurements
C                     Compute track errors and measurement variances
C                     Update the aimpoint and trackpoint by adding in track errors
C                     Save the estimated target sizes
C                     Set the tracker mode to locked on
C             Else if there is one valid tracker Then
C                     Find the tracker measurement of the good tracker
C                     Compute the aimpoint as the offset from the tracker
C                     Set the tracker mode to locked on
C             Else there are no valid trackers
C                     Set the breaklock flag
C                     Set the tracker mode to rate coast
C             End of If there are valid trackers
C
C     REFERENCES:
C
C     None
C
C
C
```

```
C      CALLING SEQUENCE:
C            CALL TRKNORNG2D
C
C      INPUTS:
C            None
C
C      OUTPUTS:
C            None
C
C      DEPENDENCIES:
C            Common Blocks
C                  PROCPARMS      -     Processing parameters
C                  TKPTPARMS      -     Trackpoint/aimpoint related parameters
C            Subroutines
C                  INTJITTER      -     Integrating jitter test
C                  LEASTSQ        -     Weighted least-squares estimator
C
C      SIDE EFFECTS:
C            None
C
C      TARGET PROCESSOR:
C            VAX 8000 series VMS 4.5, Fortran Compiler 4.5-219
C
C      HISTORY:
C            05/29/91  D. Van Rheeden Initial Release
C
C_____
C
C      Local Variables
C
C      FACTOR         Normalized magnification factor
C      H              Least-squares model matrix
C      MAXEST         Maximum number of least-squares parameter estimates
C      MAXOBS         Maximum number of least-squares observations
C      NTRACKERS      Number of trackers whose errors are being averaged
C      P              Least-squares estimate covariance matrix
C      SIGMA          Measurement standard deviation of one tracker.
C      TRACKER        Tracker index into data arrays
C      W              Least-squares weighting vector
C      XHAT           Least-squares estimate vector
C      Z              Least-squares observation vector
C      ZHAT           Least-squares estimates of tracker locations
C
C_____
C
C      Variable Declarations
C
             IMPLICIT NONE
C
             INCLUDE 'COMMON:PROCPARM.CMN'   ! Processing parameters
             INCLUDE 'COMMON:TKPTPARM.CMN'   ! Processing parameters
C
             INTEGER*2      MAXEST/3/, MAXOBS/24/, NTRACKERS,
          &                 TRACKER
C
             REAL*4         FACTOR, H(24,3), P(3,3), SIGMA, W(24),
          &                 XHAT(3), ZHAT(24), Z(24)
```

C
C_____
C                        EXECUTABLE CODE
C_____
C
C      Initialize the trackpoint measurement variances, the number of good
C      trackers, and the standard deviation for one tracker.
C
              TPVARX = 0.0
              TPVARY = 0.0
              NTRACKERS = 0.0
              SIGMA = 0.5
C
C      Set the tracker mode to locked on and the breaklock flag to false.
C
              TRKMODE = 1
              BRKLCK = .FALSE.
C
C      For each good tracker at least one cycle old...
C
              DO TRACKER = 1, MAXT
                  IF (DBASE(TRACKER,1) .EQ. 2 .AND. DBASE(TRACKER,9) .GE. 1)
       &          THEN
C
C      Assign model matrices and observation vectors used to compute
C      least-squares target aimpoint and size estimates.
C
                      H(TRACKER,1) = 1.0
                      H(TRACKER,2) = 0.0
                      H(TRACKER,3) = DIST2DX(TRACKER)
                      H(TRACKER+MAXT,1) = 0.0
                      H(TRACKER+MAXT,2) = 1.0
                      H(TRACKER+MAXT,3) = DIST2DY(TRACKER)
C
                      Z(TRACKER)        =    DBASE(TRACKER,2)
                      Z(TRACKER+MAXT)   =    DBASE(TRACKER,3)
C
C      If selected, assign least-squares weights based on the distance of the
C      tracker from the aimpoint.
C
                      IF (WEIGHTDIST) THEN
C
                          IF (DISTX(TRACKER) .GT. 0.1) THEN
                              W(TRACKER) = 1.0 / DISTX(TRACKER)
                          ELSE
                              W(TRACKER) = 10.0
                          END IF ! X normalized distance > 0.1

IF (DISTY(TRACKER) .GT. 0.1) THEN
                              W(TRACKER+MAXT) = 1.0 / DISTY(TRACKER)
                          ELSE
                              W(TRACKER+MAXT) = 10.0
                          END IF ! Y normalized distance > 0.1
C
                      ELSE ! Don't assign distance weights
C

```
              W(TRACKER)         = 1.0
              W(TRACKER+MAXT)    = 1.0
            END IF ! Assign distance weights
C
C    Increment the number of trackers counter.
C
            NTRACKERS = NTRACERS + 1
C
C    Else, zero the least-squares weights for this tracker.
C
          ELSE
              W(TRACKER)       = 0.0
              W(TRACKER+MAXT)  = 0.0
          END IF ! This tracker is good and at least 1 cycle old
        End DO ! For all good trackers
C
C    If there are at least two trackers . . .
C
        IF (NTRACKERS .GT. 1) THEN
C
C    Use least-squares to estimate aimpoint location and target size.
C
          CALL LEASTSQ (H, Z, W, XHAT, ZHAT, P, MAXEST, MAXOBS)
C
C    Run the integrating jitter test to delete trackers with bad measurements.
C
          DO TRACKER = 1, MAXT
              PREDX(TRACKER) = ZHAT(TRACKER)
              PREDY(TRACKER) = ZHAT(TRACKER+MAXT)
          END DO
          CALL INTJITTER
C
C    Recompute the estimated trackpoint location and target size
C    after removing the bad measurements.
C
          DO TRACKER = 1, MAXT
              IF (DBASE(TRACKER,1) .EQ. -1) THEN
                  W(TRACKER)      = 0.0
                  W(TRACKER+MAXT) = 0.0
              END IF ! A tracker is not valid.
          END DO ! For all trackers
          CALL LEASTSQ (H, Z, W, XHAT, ZHAT, P, MAXEST, MAXOBS)
C
C    Compute track errors and measurement variances.
C
          RESERRX = XHAT(1) - AIMX
          RESERRY = XHAT(2) - AIMY
          MAGNIFY = XHAT(3)
C
C
          TPVARX = SIGMA**2 * P(1,1)
          TPVARY = SIGMA**2 * P(2,2)
          MAGVAR = SIGMA**2 * P(3,3)
C
C    Compute the aimpoint and trackpoint.
C
          AIMX = XHAT (1)
          AIMY = XHAT (2)
C
```

```
            TRACKX = AIMX + MAGNIFY * OFFSETX
            TRACKY = AIMY + MAGNIFY * OFFSETY
C
C     Compute the estimated target sizes based on magnification.
C
            FACTOR = MAGNIFY / INITSIZEX
            RSIZEX = FACTOR * INITSIZEX
            RSIZEY = FACTOR * INITSIZEY
C
C     Else, if there is one tracker ...
C
         ELSE IF (NTRACKERS .GT. 0) THEN
C
C     Find the tracker measurement of the good tracker.
C
            TRACKER = 1
            DO WHILE (W(TRACKER) .EQ. 0.0)
                TRACKER = TRACKER + 1
            END DO ! while searching for the good tracker measurement
C
C     Compute the aimpoint as the offset from the tracker.  Use the estimated
C     magnification from the previous tracker frame.
C
            RESERRX = (Z(TRACKER) - DIST2DX(TRACKER)*MAGNIFY) - AIMX
            RESERRY = (Z(TRACKER+MAXT)-DIST2DY(TRACKER)*MAGNIFY) - AIMY
            TPVARX = SIGMA**2
            TPVARY = SIGMA**2
C
            AIMX = AIMX + RESERRX
            AIMX = AIMY + RESERRY
            TRACKX = TRACKX + RESERRX
            TRACKY = TRACKY + RESERRY
C
C     Else, set the breaklock flag to true and tracker mode to rate coast.
C
         ELSE
            BRKLCK = .TRUE.
            TRKMODE = 0
         END IF ! There are any trackers
C
         RETURN
         END C_____Section B_____
C
C                         Texas Instruments
C                        TI STRICTLY PRIVATE
C                   Property of Texas Instruments ONLY
C
C_____
C
C       SUBROUTINE TRKNORNG
C
C_____
C
```

```
C      NAME:       TRKNORNG
C
C      FUNCTION:   Computes the aimpoint and trackpoint when no range
C                  estimates are available. A least-squares estimator
C                  calculates aimpoint and target size estimates.
C                  Separate X and Y magnification factors are used.
C
C      DESCRIPTION:
C
C          Initialize the trackpoint measurement variances, the number of
C              good trackers, and the standard deviation for one tracker
C          Set the tracker mode to locked on and the breaklock flag to false
C
C          Do for all trackers
C              If a tracker is active and is at least one cycle old Then
C                  Assign model matrices and observation vectors used to compute
C                      least-squares target aimpoint and size estimates
C                  If weight trackers by distance from the aimpoint Then
C                      Assign X distance weights
C                      Assign Y distance weights
C                  Else
C                      Assign all weights to unity
C                  End of If weight trackers by distance from the aimpoint
C                  Increment the number of trackers counter
C              Else this tracker is not active or at least one cycle old
C                  Zero the least-squares weights for this tracker
C              End of If a tracker is active and at least 1 cycle old
C          End of Do for all trackers
C
C          If there are at least two valid trackers Then
C              Use least-squares to estimate trackpoint location and target size
C              Run the jitter test to delete trackers with bad measurements
C              Recompute the estimated trackpoint location and target size
C                  after removing the bad measurements
C              Compute track errors and measurement variances
C              Update the aimpoint and trackpoint by adding in track errors
C              Save the estimated target sizes
C          Else if there is one valid tracker Then
C              Find the tracker measurement of the good tracker
C              Compute the aimpoint as the offset from the tracker
C          Else there are no valid trackers
C              Set the breaklock flag to true
C              Set the tracker mode to rate coast
C          End of If there are valid trackers
C
C      REFERENCES:
C          None
C
C      CALLING SEQUENCE:
C          Call TRKNORNG
C
C      INPUTS:
C          None
C
C      OUTPUTS:
C          None
C
```

```
C     DEPENDENCIES:
C         Common Blocks
C             PROCPARMS - Processing parameters
C             TKPTPARMS - Trackpoint/aimpoint related parameters
C         Subroutines
C             LEASETSQ - Weighted least-squares estimator
C             JITTER -   Robust JITTER test
C
C     SIDE EFFECTS:
C         None
C
C     TARGET PROCESSOR:
C         VAX 8000 Series VMS 4.5, Fortran Compiler 4.5-219
C
C     HISTORY:
C         05/29/91   D. Van Rheeden Initial Release
C         07/29/91   D. Van Rheeden Added subpixel estimates
C
C_____
C
C     Local Variables
C         HX, HY            Least-squares model matrices
C         MAXEST            Maximum number of least-squares parameter estimates
C         MAXOBS            Maximum number of least-squares observations
C         NTRACKERS         Number of trackers whose errors are being averaged
C         PX, PY            Least-squares estimate covariance matrices
C         SIGMA             Measurement standard deviation of one tracker
C         SUMWX, SUMWY      Sum of weight values
C         TRACKER           Tracker index into data arrays
C         WX, WY            Least-squares weighting vectors
C         XHAT, YHAT        Least-squares estimate vectors
C         ZX, ZY            Least-squares observation vectors
C         ZXHAT, ZYHAT      Least-squares predicted observation vectors
C
C_____
C
C     Variable Declarations
C
      IMPLICIT NONE
C
      INCLUDE 'COMMON:PROCPARM.CMN'     ! Processing parameters
      INCLUDE 'COMMON:TKPTPARM.CMN'     ! Trackpoint parameters
C
      INTEGER*2    MAXEST/2/, MAXOBS/12/, NTRACKERS, TRACKER
C
      REAL*4       HX(12,2), HY(12,2), PX(2,2), PY(2,2), SIGMA,
     &             WX(12), WY(12), XHAT(12), YHAT(12),
     &             ZX(12), ZY(12), ZXHAT(12), ZYHAT(12)
C
C_____
C
C                     EXECUTABLE CODE
C_____
C
C     Initialize the trackpoint measurement variances, the number of
C     good trackers, and the standard deviation for one tracker.
C
```

```
            TPVARX = 0.0
            TPVARY = 0.0
            NTRACKERS = 0
            SIGMA = 0.5
C
C     Set the tracker mode to locked on and the breaklock flag to false.
C
            TRKMODE = 1
            BRKLCK = .FALSE.
C
C     For each good tracker at least one cycle old ...
C
      DO TRACKER = 1, MAXT
        IF (DBASE(TRACKER,1) .EQ. 2 .AND. DBASE(TRACKER,9) .GE. 1) THEN
C
C     Assign model matrices and observation vectors used to compute
C     least-squares target aimpoint and size estimates.
C
            HX(TRACKER,1)   = 1.0
            HX(TRACKER,2)   = DISTX(TRACKER)
            HY(TRACKER,1)   = 1.0
            HY(TRACKER,2)   = DISTY(TRACKER)
            ZX(TRACKER)     = DBASE(TRACKER,2) + SUBPIXX(TRACKER)
            ZY(TRACKER)     = DBASE(TRACKER,3) + SUBPIXY(TRACKER)
C
C     If selected, assign least-squares weights based on the distance of the
C     tracker from the aimpoint.
C
            IF (WEIGHTDIST) THEN
C
C
                IF (DISTX(TRACKER) .GT. 0.1) THEN
                    WX(TRACKER) = 1.0 / DISTX(TRACKER)
                ELSE
                    WX(TRACKER) = 10.0
                END IF ! X normalized distance > 0.1
C
                IF (DISTY(TRACKER) .GT. 0.1) THEN
                    WY(TRACKER) = 1.0 / DISTY(TRACKER)
                ELSE
                    WY(TRACKER) = 10.0
                END IF ! Y normalized distance > 0.1
C
            ELSE ! Don't assign distance weights
C
                WX(TRACKER) = 1.0
                WX(TRACKER) = 1.0
C
            END IF ! Assign distance weights
C
C     Increment the number of trackers counter.
C
C
C
                        NTRACKERS = NTRACKERS + 1
C
C
```

```
C     Else, zero the least-squares weights for this tracker.
C
            ELSE
               WX(TRACKER) = 0.0
               WY(TRACKER) = 0.0
            END IF ! This tracker is good and at least 1 cycle old
         END DO ! For all good trackers
C
C     If there are at least two trackers ...
C
         IF (NTRACKERS .GT. 1) THEN
C
C     Use least-squares to estimate aimpoint location and target size.
C
            CALL LEASTSQ (HX, ZX, WX, XHAT, PX, ZXHAT, MAXEST, MAXOBS)
            CALL LEASTSQ (HY, ZY, WY, YHAT, PY, ZYHAT, MAXEST, MAXOBS)
C
C     Run the jitter test to delete trackers with bad measurements.
C
            DO TRACKER = 1, MAXT
               PREDX(TRACKER) = ZXHAT(TRACKER)
               PREDY(TRACKER) = ZYHAT(TRACKER)
            END DO
            CALL JITTER
C
C     Recompute the estimated trackpoint location and target size
C     after removing the bad measurements.
C
            DO TRACKER = 1, MAXT
               IF (DBASE(TRACKER,1) .EQ. -1) THEN
                  WX(TRACKER) = 0.0
                  WY(TRACKER) = 0.0
               END IF ! A tracker is not valid.
            END DO ! For all trackers
            CALL LEASTSQ (HX, ZX, WX, XHAT, PX, ZXHAT, MAXEST, MAXOBS)
            CALL LEASTSQ (HY, ZY, WY, YHAT, PY, ZYHAT, MAXEST, MAXOBS)
C
C     Compute track errors and measurement variances.
C
            RESERRX = XHAT(1) - AIMX
            RESERRY = YHAT(1) - AIMY
            TPVARX  = SIGMA**2 * PX(1,1)
            TPVARY  = SIGMA**2 * PY(1,1)
C
C     Update the aimpoint and trackpoint by adding track errors.
C
            AIMX = AIMX + RESERRX
            AIMY = AIMY + RESERRY
C
            TRACKX = TRACKX + RESERRX
            TRACKY = TRACKY + RESERRY
C
C     Save the estimated target sizes.
C
            RSIZEX = XHAT(2)
            RSIZEY = YHAT(2)
C
```

```
C     Else, if there is one tracker ...
C
      ELSE IF (NTRACKERS .GT. 0) THEN
C
C     Find the tracker measurement of the good tracker.
C
          TRACKER = 1
          DO WHILE (WX(TRACKER) .EQ. 0.0)
              TRACKER = TRACKER + 1
          END DO ! while searching for the good tracker measurement
C
C     Compute the aimpoint as the offset from the tracker.
C
          RESERRX = (ZX(TRACKER) - DISTX(TRACKER) *·RSIZEX) - AIMX
          RESERRY = (ZY(TRACKER) - DISTY(TRACKER) * RSIZEY) - AIMY
          TPVARX = SIGMA**2
          TPVARY = SIGMA**2
C
          AIMX = AIMX + RESERRX
          AIMY = AIMY + RESERRY
          TRACKX = TRACKX + RESERRX
          TRACKY = TRACKY + RESERRY
C
C     Else, set the breaklock flag to true and tracker mode to rate coast.
C
      ELSE
          BRKLCK = .TRUE.
          TRKMODE = 0
      END IF ! There are any trackers
C
      RETURN
      END C_____Section C_____
C                            Texas Instruments
C                          T I   STRICTLY PRIVATE
C                      Property of Texas Instruments ONLY
C_____
C
C         SUBROUTINE INTJITTER
C_____
C
C     NAME: INTJITTER
C
C     FUNCTION:    Performs the integrating robust jitter test for the 2-D range
C                  independent track model.
C
C     DESCRIPTION:
C         Initialize the number of trackers to zero
C         For each good tracker at least one cycle old
C             Increment the number of trackers counters
C             Compute the difference between found and predicted
C             Save the difference in a temporary vector
C         End of loop
C
C         If at least 3 trackers are present then
C             Compute the median of the difference values
```

```
C         Compute the median absolute deviations of the difference values
C         For each good tracker at least one cycle old
C             Jitter value = ((Difference - Median) / MAD)**2
C             If the either jitter value > threshold then
C                 Execute routine to delete the tracker
C                 Set the appropriate reason for deletion flag to true
C             End of if
C         End of loop
C     End of if
C
C     REFERENCES:
C         None
C
C_____
C
C     CALLING SEQUENCE:
C         CALL INTJITTER
C
C     INPUTS:
C         None
C
C     OUTPUTS:
C         None
C
C     DEPENDENCIES:
C         Common Blocks
C             PROCPARMS - Processing parameters
C         Functions
C             MEDIAN - Calculates median of a vector of samples
C
C     SIDE EFFECTS:
C         None
C
C     TARGET PROCESSOR:
C         VAX 8000 series VMS 4.5, Fortran Compiler 4.5-219
C
C     HISTORY:
C         06/20/91  D. Van Rheeden  Initial Release
C
C_____
C
C     Local Variables
C
C         DIFF             Differences between the found and predicted locations
C         ERROR            Vertical and horizontal errors of good trackers only
C         JITRX,JITRY      Vertical and horizontal jitter scores
C         MAD_ERROR        Median absolute deviation of track errors
C         MEDIAN_ERROR     Median of track errors
C         MINMAD           Minimum allowed median absolute deviation
C         NTRACKERS        Number of good trackers
C         NSAMPLES         Number of samples to compute median/MAD
C         THRESH           Threshold for the jitter test
C         TRKR             Tracker index (position in the databases)
C
C_____
```

```
C     Variable Declarations
C
      IMPLICIT NONE
C
      INCLUDE 'COMMON:PROCPARM.CMN'   ! Processing parameters
C
      INTEGER*2   NSAMPLES, NTRACKERS, TRKR
C
      REAL*4      DIFF(24), ERROR(24), JITRX, JITRY, MAD_ERROR,
     &            MEDIAN, MEDIAN_ERROR, MINMAD /0.5/
C
      REAL*4      THRESH(24) /0.0, 0.0,18.5,20.6,21.2,16.3,
     &                       13.7, 12.3,12.3,12.3,12.3,12.3,
     &                       12.3, 12.3,12.3,12.3,12.3,12.3,
     &                       12.3, 12.3,12.3,12.3,12.3,12.3/
C
C     REAL*4      THRESH(24) /0.0,0.0,5.0,5.0,5.0,5.0,
     &                       5.0,5.0,5.0,5.0,5.0,5.0,
     &                       5.0,5.0,5.0,5.0,5.0,5.0,
     &                       5.0,5.0,5.0,5.0,5.0,5.0/
C
      EXTERNAL  MEDIAN
C
C_____
C
C                       EXECUTABLE CODE
C
C_____
C
C     Count the number of good trackers and compute the differences between the
C     predicted and the found locations.
C
      NTRACKERS = 0
      DO TRKR = 1, MAXT
       IF (DBASE(TRKR,1)..EQ. 2) THEN
         NTRACKERS = NTRACKERS + 1
         DIFF (2*TRKR-1) = FLOAT(DBASE)(TRKR,2)) - PREDX(TRKR)
         DIFF (2*TRKR)  = FLOAT(DBASE(TRKR,3)) - PREDY(TRKR)
         ERROR(2*NTRACKERS-1) = DIFF(2*TRKR-1)
         ERROR(2*NTRACKERS)   = DIFF(2*TRKR)
       END IF
      END DO
      NSAMPLES = 2 * NTRACKERS
C
C     If there are at least three good trackers Then do the jitter test.
C
      IF (NSAMPLES .GE. 3) THEN
C
C     Compute the jitter median.
C
      MEDIAN_ERROR = MEDIAN (ERROR, NSAMPLES)
C
C     Compute the jitter median absolute deviation (MAD).
C
      NTRACKERS = 0
      DO TRKR = 1, MAXT
```

```
          IF (DBASE(TRKR,1) .EQ. 2) THEN
            NTRACKERS = NTRACKERS + 1
            ERROR(2*NTRACKERS-1) = ABS (DIFF(2*TRKR-1) - MEDIAN_ERROR)
            ERROR(2*NTRACKERS)   = ABS (DIFF(2*TRKR)   - MEDIAN_ERROR)
          END IF
        END DO
C
        MAD_ERROR = MAX ((MEDIAN (ERROR, NSAMPLES) / 0.6745), MINMAD)
C
C       For each good tracker compute the jitter test scores.
C
        DO TRKR = 1, MAXT
          IF (DBASE(TRKR,1) .EQ. 2 .AND. DBASE(TRKR,9) .GT. 0) THEN
            JITRX = ((DIFF(2*TRKR-1) - MEDIAN_ERROR) / MAD_ERROR)**2
            JITRY = ((DIFF(2*TRKR)   - MEDIAN_ERROR) / MAD_ERROR)**2
C
D           WRITE (TRLUN(TRKR), *)
D           WRITE (TRLUN(TRKR), 10) 'JITRX =', JITRX, 'JITRY =', JITRY
D 10        FORMAT(2(5X,A7,F6.2))
C
C       If the jitter scores fail, delete the tracker from the database and set the
C       reason flag.  Scale the jitter values to save in integer database.
C
            IF (JITRX .GT. THRESH(NSAMPLES) .OR.
     &          JITRY .GT. THRESH(NSAMPLES)) THEN
              CALL DBDEL(TRKR)
              REASONS(2,TRKR) = .TRUE.
            END IF
C
            DBASE(TRKR,14) = 100 * JITRX
            DBASE(TRKR,15) = 100 * JITRY
C
          END IF ! good tracker
C
        END DO ! trkr = 1 to maxt
C
C       Else, if not enough trackers, set the jitter values to zero
C
      ELSE
        DO TRKR = 1, MAXT
          IF (DBASE(TRKR,1) .EQ. 2) THEN
            DBASE(TRKR,14) = 0
            DBASE(TRKR,15) = 0
D           WRITE (TRLUN(TRKR), *)
D           WRITE (TRLUN(TRKR), *) 'JITRX = 0.0JITRY = 0.0'
          END IF ! existing tracker
        END DO ! i = 1, maxt
C
      END IF ! ntrackers > = 3
C
      RETURN
      END
```

```
C_____
C
C                      Texas Instruments
C                   T I  I N T E R N A L  D A T A
C                  Property of Texas Instruments ONLY
C_____
C
C   NAME:      JITTER
C
C   FUNCTION:    Performs the robust jitter test
C
C   DESCRIPTION:
C       Initialize the number of trackers to zero
C       For each good tracker at least one cycle old
C           Increment the number of trackers counters
C           Compute the difference between found and predicted
C           Save the difference in a temporary vector
C       End of loop
C
C       If at least 3 trackers are present then
C           Compute the median of the difference values
C           Compute the median absolute deviation of the difference values
C           For each good tracker at least one cycle old
C               Jitter value = (Difference - Median)**2 / MAD **2
C               If the either jitter value > threshold then
C                   Execute routine to delete the tracker
C                   Set the appropriate reason for deletion flag to true
C               End of if
C           End of loop
C       End of if
C
C   REFERENCES:
C       None
C
C_____
C
C   CALLING SEQUENCE:
C       CALL JITTER
C
C   INPUTS:
C       None
C
C   OUTPUTS:
C       None
C
C   DEPENDENCIES:
C       Common Blocks
C           PROCPARMS - Processing parameters
C       Functions
C           MEDIAN - Calculates median of a vector of samples
C
C   SIDE EFFECTS:
C       None
C
C   TARGET PROCESSOR:
C       VAX 8000 series VMS 4.5, Fortran Compiler 4.5-219
```

```
C
C       HISTORY:
C           11/03/88  R. Broussard  Initial Release
C           01/28/91  D. Van Rheeden  Replaced mean and standard deviation with median
C                                     and median abs deviation
C
C_____
C
C    Local Variables
C
C       NTRACKERS           Number of good trackers
C       DIFFX, DIFFY        Differences between the found and predicted locations
C       ERRX, ERRY          Vertical and horizontal errors of good trackers only
C       JITRX, JITRY        Vertical and horizontal jitter scores
C       MADX, MADY          Median absolute deviation of X and Y track errors
C       MEDIANX, MEDIANY    Median of X and Y track errors
C       MINMAD              Minimum allowed median absolute deviation
C       THRESH              Threshold for the jitter test
C       TRKR                Tracker index (position in the database)
C
C_____
C
C    Variable Declarations
C
        IMPLICIT NONE
C
        INCLUDE 'COMMON:PROCPARM.CMN' ! Processing parameters
C
        INTEGER*2  NTRACKERS, TRKR
C
        REAL*4     DIFFX (12), DIFFY(12), ERRX(12), ERRY(12), JITRX,
     &             JITRY, MADX, MADY, MEDIAN, MEDIANX, MEDIANY,
     &             MINMAD /0.5/
C
        REAL*4     THRESH(12) /0.0, 0.0, 18.5, 20.6, 21.2, 16.3,
     &                         13.7, 12.3, 12.3, 12.3, 12.3, 12.3 /
C       REAL*4     THRESH(12) /0.0, 0.0, 5.0, 5.0, 5.0, 5.0,
C    &                         5.0, 5.0, 5.0, 5.0, 5.0, 5.0 /
C
        EXTERNAL  MEDIAN
C
C_____
C
C                       EXECUTABLE CODE
C
C_____
C
C    Count the number of good trackers and compute the difference between the
C    predicted and the found locations.
C
        NTRACKERS = 0
        DO TRKR = 1, MAXT
           IF (DBASE(TRKR,1) .EQ. 2) THEN
              NTRACKERS = NTRACKERS + 1
              DIFFX(TRKR) = FLOAT (DBASE(TRKR, 2)) - PREDX(TRKR)
              DIFFY(TRKR) = FLOAT (DBASE(TRKR,3)) - PREDY(TRKR)
              ERRX (NTRACKERS) = DIFFX (TRKR)
```

```
                ERRY (NTRACKERS) = DIFFY (TRKR)
            END IF
        END DO
C
C   If there are at least three good trackers Then do the jitter test.
C
        IF (NTRACKERS .GE. 3) THEN
C
C   Compute the jitter median.
C
            MEDIANX = MEDIAN ( ERRX, NTRACKERS )
            MEDIANY = MEDIAN ( ERRY, NTRACKERS )
C
C   Compute the jitter median absolute deviation (MAD).
C
        NTRACKERS = 0
        DO TRKR = 1, MAXT
            IF (DBASE(TRKR,1) .EQ. 2) THEN
                NTRACKERS = NTRACKERS + 1
                ERRX (NTRACKERS) = ABS ( DIFFX(TRKR) - MEDIANX )
                ERRY (NTRACKERS) = ABS ( DIFFY(TRKR) - MEDIANY )
            END IF
        END DO
C
        MADX = MAX ( (MEDIAN( ERRX, NTRACKERS ) / 0.6745), MINMAD )
        MADY = MAX ( (MEDIAN( ERRY, NTRACKERS ) / 0.6745), MINMAD )
C
C   For each good tracker compute the jitter test scores.
C
        DO TRKR = 1, MAXT
            IF (DBASE(TRKR,1) .EQ. 2 .AND. DBASE (TRKR, 9) .GT. 0) THEN
                JITRX = (DIFFX(TRKR) - MEDIANX)**2 / MADX**2
                JITRY = (DIFFY(TRKR) - MEDIANY)**2 / MADY**2
C
D               WRITE (TRLUN(TRKR), *)
D               WRITE (TRLUN(TRKR), 10) 'JITRX =', JITRX, 'JITRY =', JITRY
D   10          FORMAT (2(5X,A7,F6.2))
C
C   If the jitter scores fail, delete the tracker from the database and set the
C   reason flag.  Scale the jitter values to save in integer database.
C
                IF (JITRX .GT. THRESH (NTRACKERS) .OR.
     &              JITRY .GT. THRESH (NTRACKERS)) THEN
                    CALL DBDEL (TRKR)
                    REASONS (2,TRKR) = .TRUE.
                END IF
C
                IF (JITRX .LT. (2**15-1) /100) THEN
                    DBASE (TRKR,14) = 100 * JITRX
                ELSE
                    DBASE (TRKR,14) = (2**15-1) /100
                END IF
C
                IF (JITRY .LT. (2**15-1) /100) THEN
                    DBASE (TRKR, 15) = 100 * JITRY
                ELSE
                    DBASE (TRKR,15) = (2**15-1) / 100
                END IF
```

```
C
          END IF ! good tracker
C
          END DO ! trkr = 1 to maxt
C
C     Else, if not enough trackers, set the jitter values to zero
C
          ELSE
             DO TRKR = 1, MAXT
                IF (DBASE (TRKR,1) .EQ. 2) THEN
                   DBASE (TRKR,14) = 0
                   DBASE (TRKR,15) = 0
D                  WRITE (TRLUN (TRKR), *)
D                  WRITE (TRLUN (TRKR), *)' JITRX = 0.0' JITRY = 0.0'
                END IF ! existing tracker
             END DO ! i = 1, maxt
C
          END IF ! ntrackers > =3
C
          RETURN
          END
```

```
C_____Section E_____
C
C                          Texas Instruments
C                          T I  I N T E R N A L  D A T A
C                          Property of Texas Instruments ONLY
C
C_____
C
          SUBROUTINE LEASTSQ (H, Z, W, XHAT, ZHAT, P, NEST, NOBS)
C
C_____
C
C  NAME:  LEASTSQ
C
C  FUNCTION:   Weighted least-squares estimator. The estimator uses
C              the standard form:
C
C
C              x = (H^T * W * H)^{-1} * H^T * W * z
C
C     where
C         x = vector of least-squares estimates
C         z = vector of input observations
C         H = least-squares model matrix
C         W = weighting matrix
C
C     The predicted observations are computed by:
C
C
C              z = W * H * (H^T * W * H)^{-1} * H^T * W * z
C
C  DESCRIPTION:
C
C
C     Compute the matrix product HW = H^T * W
```

```
C         Compute the matrix product HW * H and invert the result
C         Save the least-squares estimate covariance matrix
C         Compute the least-squares pseudo-inverse matrix
C         Computer the least-squares estimates
C         Compute the observation estimates
C
C    REFERENCES:
C         Elbert, T. F., Estimation and Control of Systems, Van Nostrand
C         Reinhold Co., 1984, pp. 367-369.
C
C_____
C
C    CALLING SEQUENCE:
C         CALL LEASTSQ (H, Z, W, XHAT, ZHAT, P, NEST, NOBS)
C
C    INPUTS:
C         H      - Least-squares model matrix
C         NEST   - Number of least-squares estimates to compute
C         NOBS   - Number of least-squares observations to compute
C         W      - Weight vector
C         Z      - Vector of observations
C
C    OUTPUTS:
C         P      - Least-squares estimate normalized covariance matrix
C         XHAT   - Vector of least-squares estimates
C         ZHAT   - Vector of predicted observations
C
C    DEPENDENCIES:
C     Subroutines
C         MATINV   - Inverts a matrix
C         MATMULT  - Multiplies two matrices
C         MATTRAN  - Transposes a matrix
C         MVMULT   - Multiplies a matrix by a column vector
C
C    SIDE EFFECTS:
C         If the number of estimates or the number of observations become
C         larger than the local matrix dimensions, then the local matrix
C         dimensions must be increased.
C
C    TARGET PROCESSOR:
C         VAX 8000 series VMS 4.5, Fortran Compiler 4.5-219
C
C    HISTORY:
C         05/30/91   D. Van Rheeden Initial Release
C
C_____
C
C    Local Variables
C
C         I, J       Matrix loop indexes
C         HTW        Product of transposed model matrix and weights
C         HTWHINV    Inverse of the product HTW * H
C         OBS        Observation estimate model matrix
C         PSINV      Least-squares pseudo-inverse matrix
C         WTH        Transpose of the product HTW
C
C_____
```

```
C
C   Variable Declarations
C
      IMPLICIT NONE
C
      INCLUDE 'COMMON:PROCPARM.CMN'   ! Processing parameters
C
      INTEGER*2  I, J, NEST, NOBS
C
      REAL*4     H(NOBS,NEST), HTW(3,24), HTWH(3,3),
     &           OBS(24,24), P(NEST,NEST), PSINV(3,24),
     &           TEMP(3,3), W(NOBS), XHAT(NEST), WTH(24,3),
     &           Z(NOBS), ZHAT(NOBS)
C
C_____
C
C                    EXECUTABLE CODE
C
C_____
C
C
C  Compute the matrix product HW = H^T * W.  Note that W is input as a
C  vector instead of a matrix to reduce the number of computations.
C
      CALL MATTRAN (H, HTW, NOBS, NEST)
      DO = 1, NEST
        DO J = 1, NOBS
          HTW(I,J) = W(J) * HTW(I,J)
        END DO
      END DO
C
C
C  Compute the matrix product H^T * W * H and invert.  Save the result as
C  the normalized covariance matrix of the least-squares estimates.
C
      CALL MATMULT (HTW, H, HTWH, NEST, NOBS, NOBS, NEST)
      CALL MATINV (HTWH, P, TEMP, NEST, NEST)
C
C  Compute the least-squares pseudo-inverse matrix.
C
      CALL MATMULT (P, HTW, PSINV, NEST, NEST, NEST, NOBS)
C
C  Compute the least-squares estimates, x.
C
      CALL MVMULT (PSINV, Z, XHAT, NEST, NOBS, NOBS)
C
C  Compute the observation estimates, z.
C
      CALL MATTRAN (HTW, WTH, NEST, NOBS)
      CALL MATMULT (WTH, PSINV, OBS, NOBS, NEST, NEST, NOBS)
      CALL MVMULT (OBS, Z, ZHAT, NOBS, NOBS, NOBS)
C
      RETURN
      END
```

```
C                       Section F
C_____
C                        Texas Instruments
C                        T I INTERNAL DATA
C                  Property of Texas Instruments ONLY
C_____
C
C       COMMON BLOCK TKPTPARM
C
C
C       MNEUMONIC:  TRacKPoinT measurement PARaMeters common block
C
C       AUTHOR:     Don Van Rheeden
C
C       HISTORY:
C       01/09/91    D. Van Rheeden Initial release
C
C
C                    VARIABLE DECLARATIONS
C
C
                COMMON TKPTPARMS/ AMOUNT_SHIFTED, BIAS_COUNT,
      &         BIAS_INTERVAL,
      &         BIASX, BIASY, COMPUTE_SUBPIX, DISP_UPPER,
      &         DISTX, DISTY, DIST2DX, DIST2DY,
      &         INITSIZEX, INITSIZEY, MAGNIFY, MAGVAR,
      &         MODEL, OFFSETX, OFFSETY, RANGEIND,
      &         RECEMTERP, RECENERY, SAVED_LOSP,
      &         SUBPIXX, SUBPIXY, TRKMODE, WEIGHTDIST/
C
                INTEGER *2   BIAS COUNT INITSIZEX, INITSIZEY, MODEL,
      &                      RECENTERX, RECENTERY, TRKMODE
C
                REAL *4      AMOUNT_SHIFTED, BIAS_INTERVAL, BIASX,
      &                      BIASY, DISP_CORR, DISP_UPPER, DISTX(12),
      &                      DISTY (12), DIST2DX(12), DIST2DY(12), MAGNIFY,
      &                      MAGVAR, OFFSETX, OFFSETY, SAVED_LOSP,
      &                      SUBPIXX(12), SUBPIXY(12)
C
        LOGICAL*2   COMPUTE_SUBPIX, RANGEIND, WEIGHTDIST
C
C                    VARIABLE DESCRIPTIONS
C
C  AMOUNT_SHIFTED  Number of meters shifted on target by aimpoint bias
C  BIAS_COUNT      Aimpoint bias counter
C  BIAS_INTERVAL   Number of seconds between aimpoint biases
C  BIAS X, Y       Aimpoint biasing weights:
C                      BIASX=0.0 -bias left BIASY=0.0 -bias down
C                      BIASX=0.5 -no bias BIASY=0.5 -no bias
C                      BIASX=1.0 -bias rightBIASY=1.0 -bias up
C  COMPUTE_SUBPIX  Compute subpixel esteimate flag
C  DIST2DX,Y       Distances normalized by 2-D magnification
C  INITSIZEX,Y     Target size at tracker initialization
C  MAGNIFY         Estimated magnifications factor
C  MAGVAR          Variance of the magnification factor estimate
C  MODEL           Range independent tracking model:
C                      1- 1-D Model (X & Y estimated independently)
C                      2- 2-D Model (X & Y estimated simultaneously)
```

```
C     OFFSETX,Y          Offset of aimpoint from trackpoint
C     RANGEIND           Range independent tracking flag
C     RECENTERP, Y       Aimpoint recenter values (PITCH, YAW)
C     SAVED_LOSP         Line-of-sight pitchsaved from last aimpoint bias
C     SUBPIXX,Y          Trackpoint subpixel shift estimates
C     TRKMODE            Integer tracker mode:
C                        0 - rate coast (breaklock)
C                        1 - locked on (confident track)
C     WEIGHTDIST         Flag to weight each tracker measurement by its distance from
C                        the aimpoint
C     DISP_CORR          Average displacement all correlators
C     DISP_UPPER         Average displacement of upper correlators
C     DISTX,Y            Distances from trackpoint normalized by size
C_____
C                           Texas Instruments
C                           TI INTERNAL DATA
C                     Property of Texas Instruments ONLY
C_____
C
C     COMMON BLOCK PROCPARM
C
C     MNUEMONIC:  PROCessing PARaMeters common block
C
C     AUTHOR:     Roger Broussard
C
C     HISTORY:
C     10/31/88   R. Broussard   Generated from program TRACK written by
C                               Cam Kaszas for AGB program
C     1/09/90    D. Van Rheeden  Added variables to run AAWS-M images
C     4/11/91    D. Van Rheeden  Removed oresight jutter: XTRAN, YTRAN
C     4/15/91    D. Van Rheeden  Added image dimensions: IMGROWS,
C                                IMGCOLS
C     4/17/91    D. Van Rheeden  Added max limits; MAXACF, MAXCONT
C     4/22/91    D. Van Rheeden  Added screen limits: MINX, Y and MAXX,Y
C     5/20/91    D. Van Rheeden  Added CONTTH MIN: removed HSKIP, VSKIP
C     5/24/91    D. Van Rheeden  Added trackability/ update to REASONS
C     5/24/91    D. Van Rheeden  Added reference update age threshold
C     5/28/91    D. Van Rheeden  Added real target, noisex,
C     6/13/91    D. Van Rheeden  Added line of sight angles, LOSP, Y
C     6/17/91    D. Van Rheeden  Replaced IRRES with RAD_TO_PIX,
C                                PIX_TO_RAD
C     6/17/91    D. Van Rheeden  Added last fram X,Y coordinates to DBASE
C
C                       VARIABLE DECLARATIONS
C
      COMMON /PROCPARMS/ACOR, AGETH, AIMX, AIMY, ALTITUDE,
     &           APMODE, BRKLCK, CCOR, CFT, CHECKS, COLOR,
     &           CONT, CONTTH,CONTTH_MIN, CYCLE, DBASE,
     &           DCHISL, DCHISU, DCREFX, DCREFY, DCSERX,
     &           DCSERY, DRANGE, FRATE, HGREFX, HGREFY,
     &           IMGCOLS, IMGGAIN, IMGROWS, LOSP, LOSY LOSRP,
     &           LOSRY, LUNN, MAXACF, MAXCONT, MAXP, MAXT,
     &           MAXX, MAXY, MINX, MINY, NZSIGMA, OLDRNG,
     &           PIX_TO_RAD, PREDX, PREDY, RAD_TO_PIX,
     &           RANGE, RANGE_GOOD, REASONS, RESERRX, RESERRY,
```

```
     &          RSIZEX, RSIZEY, SR, SRTH, TGTSZX, TGTSZY, TPVARX,
     &          TPVARY, TRACKX, TRACKY, TRLUN, VELOCITY
C
            INTEGER*2 AGETH, CHECKS, CONT, CONITH, CONTTHIN, CYCLE,
     &          DBASE(12,17), DCHISL, DCHISU, DCREFX, DCREFY,
     &          DCSERX, DCSERY, HGREFX, HGREFY, IMGCOLS,
     &          IMGROWS, LUNN, MAXACF, MAXCONT, MAXP, MAXT,
     &          MAXX, MAXY, MINX, MINY, SR, SRTH, TRLUN(12)
C
            INTEGER*4 ACOR(25,25), APMODE, CCOR(25,25), COLOR(12)
C
            REAL*4   AIMX, AIMY, ALTITUDE, DRANGE, FRATE,
     &          IMGGAIN, LOSP, LOSY, LOSRP, LOSRY, NZSIGNMA,
     &          OLDRNG, PIX_TO_RAD, PREDX(12), PREDY(12),
     &          RAD_TO_PIX, RANGE, RESERRX, RESERRY, RSIZEX,
     &          RSIZEY, SUMP, SUMY, TGRSZX, TGTSZY, TPVARX,
     &          TPVARY, TRACKX, TRACKY, VELOCITY
C
            LOGICAL*2 BRKLCK, CFT/.TRUE./, RANGE_GOOD, REASONS(4,12)
C
C                          VARIABLE DESCRIPTIONS
C
C ACOR,CCOR    Auto-correlation and cross-correlation matrices
C AGETH        Reference update tracker age threshold
C AIMX, AIMY   Horizontal and vertical position of the aimpoint (0.0,0.0 in upper left)
C APMODE       Autopilot mode
C ALTITUDE     Altitude of the platform (meters)
C BRKLCK       Breaklock flag (no good tackers in database)
C CHECKS       Total number of checks allowed this cycle
C CFT          Captive flight test indicator
C COLOR        The color index used to identify trackers
C CONT, SR     Current local contrast and sharpness ratio scores
C CONTTH, SRTH    Local contract and sharpness ratio thresholds
C CONNTH_MIN   Minimum allowed local contrast threshold
C CYCLE        Track cycle number, 0 = Initialization cycle
C DBAS(j,k)    Tracker data base
C               DBASE(j,1):    -1 = slot free, 2==> slot full
C               DBASE(j,2):    X coordinate for tracker j
C               DBASE(j,3):    Y coordinate for tracker j
C               DBASE(j,4):    Local contrast score
C               DBASE(j,5):    Sharpness ratio score
C               DBASE(j,6):    Zone number
C               DBASE(j,7):    -1==> outside OSR (needs replacement)
C                              2==> in bounds
C               DBASE(j,8):    Reference update threshold
C               DBASE(j,9):    Cycles active
C               DBASE(j,10):   Cross correlation score at best match
C               DBASE(j,11):   X predicted position
C               DBASE(j,12):   Y predicted position
C               DBASE(j,13):   Reference update flag:
C                                -1 ==> reset
C                                 2 ==> set (perform reference update)
C               DBASE(j,14):   Jitter test X score
C               DBASE(j,15):   Jitter text Y score
C               DBASE(j,16):   X coordinate from last frame
C               DBASE(j,17):   Y coordinate from last frame
C DCHISL, DCHISU   Lower and upper thresholds for the local contrast histogram
C                  computation
```

```
C DCREFX, DCREFY  Horizontal and vertical size of the reference array
C DCSERX, DCSERY  Horizontal and vertical size of the search array
C DRANGE          Change in slant range between each image (meters/frame)
C FRATE           Frame rate (seconds/frame)
C HGREFX, HGREFY  Horizontal and vertical size of the reference are used
C                 to compute the local contrast
C IMGCOLS, IMGROWS Image horizontal and vertical dimensions
C IMGGAIN         Image global gain
C LOSP, LOSY      Pitch/Yaw line-of-sight angles (radians)
C LOSRP, LOSRY    Pitch/Yaw line-of-sight rates (radians/sec)
C LUNN            Logical unit number counter for tracker output
C MAXACF          Maximum number of autocorrelation function shape tests
C MAXCONT         Maximum number of local contrast tests
C MAXP            Number of parameters per tracker (= = > DBASE(i,MAXP))
C MAXT            Maximum number of trackers allowed
C                 (= = >DBASE(MAXT,j))
C MAXX, MAXY      Maximum horizontal and vertical search area boundaries
C MINX, MINY      Minimum horizontal and vertical search area boundaries
C NZSIGMA         Standard deviation of the image noise
C OLDRNG          Previous target range
C PIX_TO_RAD      Pixels to radians conversion factor
C PREDX, PREDY    Floating point values for predicted tracker locations
C RAD_TO_PIX      Radians to pixels conversion factor
C RANGE           Slant range (meters)
C RANGE_GOOD      Range good indicator
C REASONS         Reason flags for why tracker was deleted or updated:
C                 REASONS(1,x)- Tracker is out-of-bounds,
C                 REASONS(2,x)- Tracker failed jitter test
C                 REASONS(3,x)- Tracker failed trackability tests
C                 REASONS(4,x)- Tracker reference update occurred
C RESERRX,RESERRY  Correlation residual error (pixels)
C RSIZEX, RSIZEY  Real-value target size for limiting subimage search
C SUMP, SUMY      Pitch/ Yaw integrated line-of-sight (radians)
C TGTSZX, TGTSZY  Target size for limiting subimage search region
C TPVARX, TPVARY  Trackpoint measurement variance
C TRACKX, TRACKY  Horizontal and vertical position of the trackpoint
C                 (0.0, 0.0 in upper left)
C TRLUN           Logical unit numbers for the existing trackers
C VELOCITY        Velocity of the platform (meters/second)
C
C
C                         Section G
C
C                       Texas Instruments
C                       TI INTERNAL DATA
C                  Property of Texas Instruments ONLY
C
C
C      SUBROUTINE DBDEL (TRACKER)
C
C      NAME:    DBDEL
C
C      FUNCTION:   Deletes a tracker from the database
C
C      DESCRIPTION:
C      Set the values of the tracker location to -1
C      Compute the location of the reference subimage in B memory
```

```
C     Clear the region of B memory used for the reference subimage
C
C     REFERENCES:
C         None
C
C     CALLING SEQUENCE:
C         Call DBDEL (TRACKER)
C
C     INPUTS:
C         TRACKER - Index of tracker to delete
C
C     OUTPUTS:
C         None
C
C     DEPENDENCIES:
C         Common Blocks
C             ASPMEMYS - APAP A and B memories
C             PROCPARMS - Processing parameters
C
C     SIDE EFFECTS:
C         None
C
C     TARGET PROCESSOR:
C         VAX 8000 series VMS 4.5, Fortran Compiler 4.5 -219
C
C     HISTORY:
C         11/08/88   R. Broussard    Initial Release
C                 Local Variables
C         I,J     Loop counters
C         MXSTRT  Starting column of reference subimage in B memory
C         MYSTRT  Starting row of reference subimage in B memory
C
C     Variable Declarations
C
      IMPLICIT NONE
C
      INCLUDE 'COMMON: APMEMY. CMN! '  APAP A and B memories
      INCLUDE 'COMMON:PROGPARM. CMN! ' Processing parameters
C
      INTEGER*2    I, J, MXSTRT, MYSTRT, TRACKER
C
C
C_____
                        EXECUTABLE CODE
C_____
C
C     Set the tracker indicator in the database to indicate available.
C
      DBASE( TRACKER,1) = -1
C
C     Determine the location of the tracker in B memory.
C
      MXSTRT = MOD( TRACKER-1, 8) *16 +1
      MYSTRT = (( TRACKER-1)/8 * 16 +1
C     Erase reference image and label from B memory.
C
      DO J = 1, 16
         DO I = 1, 16
```

```
          DMEMYB( MXSTRT+I-1, MYSTRT+J-1) = 0
        END DO
      END DO
C
C
C     For Debugging ...
C
D     CLOSE( UNIT=TRLUN( TRACKER))
C
      RETURN
      END
```

```
C_____
C
C
C                     Texas Instruments
C                     TI INTERNAL DATA
C                 Property of Texas Instruments ONLY
C
C
C_____
C
C          REAL*4 FUNCTION MEDIAN (VECTOR, NSAMPLES)
C
C_____
C
C     NAME:     MEDIAN
C
C     FUNCTION:    Computes the median of a vector of numbers.
C
C     DESCRIPTION:
C         Sort the input vector from smallest to largest
C         If the number of input samples is even Then
C             Median = average of two middle samples
C         Else the number of input samples is odd
C             Median = middle sample
C         End If
C
C     REFERENCES:
C         None
C
C_____
C
C     CALLING SEQUENCE:
C         MEDIAN_VALUE = MEDIAN (VECTOR, NSAMPLES)
C
C     INPUTS:
C         VECTOR   - Input vector containing samples to process
C         NSAMPLES - Number of samples in VECTOR
C
C     OUTPUTS:
C         MEDIAN - Output median value
C
C     DEPENDENCIES:
C         None
C
C     SIDE EFFECTS:
C         None
C
C     TARGET PROCESSOR:
C         VAX 8000 series VMS 4.5, Fortran Compiler 4.5-219
```

```
C
C      HISTORY:
C          01/28/91   D. Van RheedenInitial Release
C          06/20/91   D. Van RheedenReduced outer sorting loop from N-1
C                         samples to N/2+1 samples
C
C_____
C
C      Local Variables
C
C          I, J       Sorting loop counters
C          MIDDLE     Address of middle value in the sorted input vector
C          TEMP       Temporary storage used by sorting loops
C
C_____
C
C      Variable Declarations
C
       IMPLICIT NONE
C
       INTEGER*2  I, J, MIDDLE, NSAMPLES
C
       REAL*4     TEMP, VECTOR (NSAMPLES)
C
C_____
C
C                    EXECUTABLE CODE
C
C_____
C
C      Sort the input vector from smallest to largest values.
C
       DO I = 1,NSAMPLES/2+1
         DO J = 2,NSAMPLES
           IF ( VECTOR(J) .LT. VECTOR(J-1) ) THEN
             TEMP = VECTOR(J-1)
             VECTOR(J-1) = VECTOR(J)
             VECTOR(J) = TEMP
           END IF
         END DO
       END DO
C
C      Compute the median.  If the number of input samples is even, the
C      median is the average of the two middle samples.  If the number of
C      samples is odd, the median is the middle sample.
C
       IF (MOD(NSAMPLES,2) .EQ. 0) THEN
         MIDDLE = NSAMPLES/2
         MEDIAN = (VECTOR(MIDDLE) + VECTOR(MIDDLE+1)) / 2.0
       ELSE
         MIDDLE = NSAMPLES/2 + 1
         MEDIAN = VECTOR(MIDDLE)
       END IF
C
       RETURN
       END
```

```
C_____
C
C                       Texas Instruments
C                       TI INTERNAL DATA
C                Property of Texas Instruments ONLY
C
C_____
C
        SUBROUTINE MATADD ( M1, M2, SUM, ROWS, COLS )
C
C_____
C
C   NAME:      MATADD
C
C   FUNCTION:   Adds two matrices.
C
C   DESCRIPTION:
C       Sum = matrix #1 + matrix #2.
C
C   REFERENCES:
C
C_____
C
C   CALLING SEQUENCE:
C       CALL MATADD ( M1, M2, SUM, ROWS, COLS )
C
C   INPUTS:
C       M1, M2       - Input matrices
C       ROWS, COLS   - Matrix dimensions
C
C   OUTPUTS:
C       SUM - Output matrix sum
C
C   DEPENDENCIES:
C       None
C
C   TARGET PROCESSOR:
C       VAX 8000 series VMS 4.5, Fortran Compiler 4.5-219
C
C   HISTORY:
C       02/18/91        D. Van Rheeden  Initial Release
C
C_____
C
C   Local Variables
C
C       I, J    Matrix indexes
C
C_____
C
C   Variable Declarations
C
        IMPLICIT NONE
C
        INTEGER*2    COLS, I, J, ROWS
C
        REAL*4       M1(ROWS,COLS), M2(ROWS,COLS),
```

```
     &          SUM(ROWS,COLS)
C
C_____
C
C                    EXECUTABLE CODE
C
C_____
C
C   Add the two input matrices.
C
        DO I = 1, ROWS
         DO J = 1, COLS
          SUM(I,J) = M1(I,J) + M2(I,J)
         END DO
        END DO
C
        RETURN
        END
C
C
C_____
C
        SUBROUTINE MATSUB ( M1, M2, DIFF, ROWS, COLS )
C
C_____
C
C   NAME:       MATSUB
C
C   FUNCTION:   Subtracts two matrices.
C
C   DESCRIPTION:
C       Difference = matrix #1 - matrix #2.
C
C   REFERENCES:
C
C_____
C
C   CALLING SEQUENCE:
C       CALL MATSUB ( M1, M2, DIFF, ROWS, COLS )
C
C   INPUTS:
C       M1, M2  -    Input matrices
C       ROWS, COLS -   Matrix dimensions
C
C   OUTPUTS:
C       DIFF - Output matrix difference
C
C   DEPENDENCIES:
C       None
C
C   SIDE EFFECTS:
C       None
C
C   TARGET PROCESSOR:
C       VAX 8000 series VMS 4.5, Fortran Compiler 4.5-219
C
```

```
C      HISTORY:
C            02/18/91     D. Van Rheeden  Initial Release
C
C_____
C
C      Local Variables
C
C         I, J     Matrix indexes
C
C_____
C
C      Variable Declarations
C
       IMPLICIT NONE
C
       INTEGER*2    COLS, I, J, ROWS REAL*4       M1(ROWS,COLS), M2(ROWS,COLS), DIFF(ROWS,COLS)
C
C_____
C
C                      EXECUTABLE CODE
C
C_____
C
C      Subtract the two input matrices.
C
       DO I = 1, ROWS
         DO J = 1, COLS
           DIFF(I,J) = M1(I,J) + M2(I,J)
         END DO
       END DO
C
       RETURN
       END
C
C
C_____
C
       SUBROUTINE MATMULT ( M1, M2, PROD, ROW1, COL1, ROW2, COL2 )
C
C_____
C
C      NAME:     MATMULT
C
C      FUNCTION:    Multiplies two matrices.
C
C      DESCRIPTION:
C           If inner matrix dimensions do not match Then
C              Write status message to the user.
C              Exit from the program.
C           End if inner matrix dimensions do not match.
C           Product = matrix #1 * matrix #2.
C
C      REFERENCES:
```

```
C
C_____
C
C     CALLING SEQUENCE:
C         CALL MATMULT ( M1, M2, PROD, ROW1, COL1, ROW2, COL2 )
C
C     INPUTS:
C         M1, M2        - Input matrices
C         ROW1, COL1    - Input matrix M1 dimensions
C         ROW2, COL2    - Input matrix M2 dimensions
C
C     OUTPUTS:
C         PROD - Output matrix product
C
C     DEPENDENCIES:
C         EXIT - System exit routine
C
C     SIDE EFFECTS:
C         None
C
C     TARGET PROCESSOR:
C         VAX 8000 series VMS 4.5, Fortran Compiler 4.5-219
C
C     HISTORY:
C         02/18/91    D. Van Rheeden    Initial Release
C
C_____
C
C     Local Variables
C
C         I, J, K       Matrix indexes
C         SUM           Product accumulator
C
C_____
C
C     Variable Declarations
C
      IMPLICIT NONE
C
      INTEGER*2  COL1, COL2, I, J, K, ROW1, ROW2
C
      REAL*4     M1(ROW1,COL1), M2(ROW2,COL2), PROD(ROW1,COL2),
     &           SUM
C
C_____
C
C                    EXECUTABLE CODE
C
C_____
C
C     If the inner matrix dimensions do not agree, write a status message
C     and exit the program.
C
      IF ( COL1 .NE. ROW2 ) THEN
          WRITE(6,*) ' Error in MATMULT'
     &          ' Inner matrix dimensions do not agree.'
          CALL EXIT (0)
      END IF
```

```fortran
C
C     Multiply the two input matrices.
C
      DO I = 1, ROW1
        DO J = 1, COL2
          SUM = 0.0
          DO K = 1, COL1
            SUM = SUM + M1(I,K) * M2(K,J)
          END DO
          PROD(I,J) = SUM
        END DO
      END DO
C
      RETURN
      END
C
C
C_____
C
      SUBROUTINE MATCOPY ( M, COPY, ROWS, COLS )
C
C_____
C
C     NAME:      MATCOPY
C
C     FUNCTION:  Copies a matrix.
C
C     DESCRIPTION:
C         Copy the input matrix to the output matrix.
C
C     REFERENCES:
C
C_____
C
C     CALLING SEQUENCE:
C         CALL MATCOPY ( M, COPY, ROWS, COLS )
C
C     INPUTS:
C         M    - Input matrix
C         ROWS, COLS - Matrix dimensions
C
C     OUTPUTS:
C         COPY - Copy of the input matrix
C
C     DEPENDENCIES:
C         None
C
C     SIDE EFFECTS:
C         None
C
C     TARGET PROCESSOR:
C         VAX 8000 series VMS 4.5, Fortran Compiler 4.5-219
C
C     HISTORY:
C         02/18/91   D. Van Rheeden    Initial Release
C
C_____
```

```
C
C    Local Variables
C
C        I, J    Matrix indexes
C
C
C_____
C
C    Variable Declarations
C
       IMPLICIT NONE
C
       INTEGER*2   COLS, I, J, ROWS
C
       REAL*4      M(ROWS,COLS), COPY(ROWS,COLS)
C
C_____
C
C                    EXECUTABLE CODE
C
C_____
C
C    Copy the input matrix into the output matrix.
C
       DO I = 1, ROWS
         DO J = 1, COLS
           COPY(I,J) = M(I,J)
         END DO
       END DO
C
C
       RETURN
       END
C
C
C_____
C
       SUBROUTINE MATTRAN ( M, TRANS, ROWS, COLS )
C
C_____
C
C    NAME:        MATTRAN
C
C    FUNCTION:    Transposes a matrix.
C
C    DESCRIPTION: Transpose the input matrix.
C
C    REFERENCES:
C
C_____
C
C    CALLING SEQUENCE:
C        CALL MATTRAN ( M, TRANS, ROWS, COLS )
C
C    INPUTS:
C        M           - Input matrix
C        ROWS, COLS  - Matrix dimensions
C
```

```
C     OUTPUTS:
C         TRANS - Output matrix difference
C
C     DEPENDENCIES:
C         None
C
C     SIDE EFFECTS:
C         None
C
C     TARGET PROCESSOR:
C         VAX 8000 series VMS 4.5, Fortran Compiler 4.5-219
C
C     HISTORY:
C         02/18/91    D. Van Rheeden  Initial Release
C
C_____
C
C     Local Variables
C
C         I, J      Matrix indexes
C
C_____
C
C     Variable Declarations
C
      IMPLICIT NONE
C
      INTEGER*2  COLS, I, J, ROWS
C
      REAL*4     M(ROWS,COLS), TRANS(ROWS,COLS)
C
C_____
C
C                    EXECUTABLE CODE
C
C_____
C
C     Transpose the input matrix.
C
      DO I = 1, ROWS
        DO J = 1, COLS
          TRANS(J,I) = M(I,J)
        END DO
      END DO
C
      RETURN
      END
C
C
C_____
C
      SUBROUTINE MATDET ( M, DET, WORK, ROWS, COLS )
C
C_____
C
C     NAME:         MATDET
C
```

```
C      FUNCTION:    Computes the determinant of a square matrix.
C
C      DESCRIPTION:
C           If the input matrix is not square Then
C              Write status message to the user.
C              Exit from the program.
C           End if input matrix is not square.
C           Copy input matrix into temporary work array.
C           Decompose the matrix into lower/upper (LU) form.
C           Determinant = product of LU matrix diagonal elements.
C
C      REFERENCES:
C
C_____
C
C      CALLING SEQUENCE:
C           CALL MATDET ( M, DET, WORK, ROWS, COLS )
C
C      INPUTS:
C           M            - Input matrix
C           ROWS, COLS   - Matrix dimensions
C
C           WORK         - Temporary work array
C
C      OUTPUTS:
C           DET - Output matrix determinant
C
C      DEPENDENCIES:
C           EXIT         - System exit routine
C           MATLUD       - Lower/Upper (LU) matrix decomposition
C
C      SIDE EFFECTS:
C           A copy should be made of the input matrix unless the user
C           desires to use the LU decomposed matrix.
C
C      TARGET PROCESSOR:
C           VAX 8000 series VMS 4.5, Fortran Compiler 4.5-219
C
C      HISTORY:
C           02/18/91   D. Van Rheeden   Initial Release
C
C_____
C
C      Local Variables
C
C           I J      Matrix indexes
C           INDX     LU decomposition backsubstitution index vector
C
C_____
C
C      Variable Declarations
C
       IMPLICIT NONE
C
       INTEGER*2    COLS, I, INDX(50), J, ROWS
C
       REAL*4     DET, M(ROWS,COLS), WORK(ROWS,COLS)
```

```
C
C
C_____
C                                                                      *
C              EXECUTABLE CODE                                         *
C                                                                      *
C_____
C
C      If the input matrix is not square then write a status message and
C      exit the program.
C
       IF ( ROWS .NE. COLS ) THEN
         WRITE (6,*) ' Error in MATDET ... ',
     &    ' Cannot compute determinant of a 'nonsquare matrix. '
         CALL EXIT (0)
       END IF
C
C      Copy input matrix into temporary work array.
C
       CALL MATCOPY ( M, WORK, ROWS, COLS)
C
C      Decompose the input matrix into lower/upper (LU) form.
C
       CALL MATLUD ( WORK, ROWS, COLS, INDX, DET )
C
C      Compute determinant as the product of the diagonal elements of
C      the LU decomposed matrix. The return value DET from MATLUD
C      determines the sign of the determinant.
C
       DO J = 1, ROWS
         DET = DET + WORK(J,J)
       END DO
C
       RETURN
       END
C
C_____
C
       SUBROUTINE MATINV ( M, INV, WORK, ROWS, COLS)
C
C_____
C
C      NAME:       MATINV
C
C      FUNCTION:   Inverts a square matrix.
C
C      DESCRIPTION:
C          If the input matrix is not square Then
C             Write status message to the user.
C             Exit from the program.
C          End if input matrix into the work array.
C          Copy input matrix into the work array.
C          Decompose the matrix into lower/upper (LU) form.
C          Do backsubstitution of the LU decomposed matrix one row
C             at a time.
C
C      REFERENCES:
C
```

```
C
C
C      CALLING SEQUENCE:
C          CALL MATINV ( M, INV, WORK, ROWS, COLS )
C
C      INPUTS:
C
C          M            - Input matrix
C          ROWS, COLS   - Matrix dimensions
C          WORK         - Temporary work space matrix
C
C      OUTPUTS:
C
C          M            - LU decomposition of the input matrix
C          INV          - Output inverse matrix
C
C      DEPENDENCIES:
C          EXIT         - System exit routine
C          MATLUB       - Lower/Upper (LU) matrix backsubstitution
C          MATLUD       - Lower/Upper (LU) matrix decomposition
C
C      SIDE EFFECTS:
C          None
C
C      TARGET PROCESSOR:
C          VAX 8000 series VMS 4.5, Fortran Compiler 4.5-219
C
C      HISTORY:
C
C          02/18/91   D. Van Rheeden   Initial Release
C
C_____
C
C_____
C
C      Local Variables
C
C          L, J         Matrix indexes
C          INDX         LU decomposition backsubstitution index vector
C          SIGN         LU decomposition return sign
C          V            LU backsubstitution solution vector
C
C_____
C
C      Variable Declarations
C
       IMPLICIT NONE
C
       INTEGER*2   COLS, I, INDX(50), J, ROWS
C
       REAL*4      INV(ROWS,COLS), M(ROWS,COLS), SIGN, V(50),
     &             WORK(ROWS,COLS)
C
C_____
C
C                 EXECUTABLE CODE
C
```

```
C
C
C      If the input matrix is not square then write a status message and
C      exit the program.
C
       IF ( ROWS .NE. COLS ) THEN
         WRITE(6,*) ' Error in MATINV...',
    '        ' Cannot invert a nonsquare matrix. '
         CALL EXIT (0)
       END IF
C
C      Copy input matrix into the work array.
C
       CALL MATCOPY ( M, WORK, ROWS, COLS, )
C
C      Decompose the input matrix into lower/upper (LU) form.
C
       CALL MATLUD ( WORK, ROWS, COLS, INDX, SIGN )
C
C      Perform backsubstitution of the LU decomposed matrix one row
C      at a time.
C
       DO J = 1, COLS
         DO I = 1, ROWS
           V(I) = 0
         END DO
         V(J) = 1.0
         CALL MATLUB ( WORK, ROWS, COLS, INDX, V )
         DO I = 1, ROWS
           INV(I,J) = V(I)
         END DO
       END DO
C
       RETURN
       END
C
C
C            SUBROUTINE MATLUD ( M, ROWS, COLS, INDX, SIGN)
C
C
C
C     NAME:    MATLUD
C
C     FUNCTION:  Matrix Lower/Upper (LU) decomposition.
C
C     DESCRIPTION:
C           If the input matrix is not square Then
C              Write status message to the user.
C              Exit from the program.
C           End if input matrix is not square.
C           Decompose the matrix into lower/upper (LU) form.
C
C     REFERENCES:
C
C
C
```

```
C
C     CALLING SEQUENCE:
C         CALL MATLUD ( M, ROWS, COLS, INDX, SIGN )
C
C     INPUTS:
C
C         M            - Input matrix
C         ROWS, COLS   - Matrix dimensions
C
C     OUTPUTS:
C
C         M            - LU decomposition of the input matrix
C         INDX         - Backsubstitution index vector
C         SIGN         - LU decomposition return sign (+-1)
C
C     DEPENDENCIES:
C         EXIT         - System exit routine
C
C     SIDE EFFECTS:
C         None
C
C     TARGET PROCESSOR:
C         VAX 8000 series VMS 4.5, Fortran Compiler 4.5-219
C
C     HISTORY:
C
C         02/18/91   D. Van Rheeden    Initial Release
C
C_____
C
C     Local Variables
C
C         BIG     Input matrix element with largest magnitude
C         DUM     Dummy argument used for temporary storage
C         I, J, K Matrix loop indexes
C         IMAX    Decomposition index values saved in INDX vector
C         SUM     Intermediate sum
C         TINY    Small number used to prevent divides by zero
C         VV      Pivot vector
C
C_____
C
C     Variable Declarations
C
      IMPLICIT NONE
C
      INTEGER*2  COLS, I, IMAX, INDX(50), J, K, ROWS
C
      REAL*4     BIG, DUM, M(ROWS,COLS), SIGN, SUM, TINY/1.0e-20/, VV(50)
C
C_____
C
C               EXECUTABLE CODE                              *
C                                                            *
C_____
C
C     If the input matrix is not square then write a status message and
C     exit the program.
```

```
C
      IF ( ROWS .NE. COLS ) THEN
         WRITE(6,*) ' Error in MATLUD...',
     &              ' Cannot decompose a nonsquare matrix. '
         CALL EXIT (0)
      END IF
C
C     Decompose the input matrix into lower/upper (LU) form.
C
      SIGN = 1.0
C
      DO I = 1, ROWS
        BIG = 0.0
        DO J = 1, COLS
          IF ( ABS( M(I,J) ) .GT. BIG) BIG = ABS( M(I,J) )
        END DO
        IF (BIG .EQ. 0.0) THEN
           WRITE(6,*) ' Error in MATLUD...',
     &                ' Matrix is singular.'
           CALL EXIT (0)
        END IF
        VV(I) = 1.0 / BIG
      END DO
C
      DO J = 1, ROWS
        IF (J .GT. 1) THEN
          DO I = 1, J-1
            SUM - M(I,J)
            IF (I .GT. 1) THEN
              DO K = 1, I-1
                SUM = SUM - M(I,K) + M(K,J)
              END DO
              M(I,J) = SUM
            END IF
          END DO
        END IF
C
        BIG = 0.0
C
        DO I = J, ROWS
C
          SUM = M(I,J)
C
          IF (J .GT. 1) THEN
            DO K = 1, J-1
              SUM = SUM - M(I,K) + M(K+J)
            END DO
            M(I,J) = SUM
          END IF
C
          DUM = VV(I) * ABS(SUM)
C
          IF (DUM .GT. BIG) THEN
            BIG = DUM
            IMAX = I
          END IF
        END DO
```

```
C
         IF (J .NE. IMAX) THEN
           DO K = 1, ROWS
             DUM = M(IMAX,K)
             M(IMAX,K) = M(J,K)
             M(J,K) = DUM
           END DO
           SIGN = -SIGN
           VV(IMAX) = VV(J)
         END IF
C
         INDX(J) = IMAX
C
         IF ( J .LT. COLS ) THEN
             IF ( M(J,J) .EQ. 0.0 ) M(J,J) = TINY
             DUM - 1.0 / M(J,J)
             DO I = J+1, ROWS
               M(I,J) = M(I,J) * DUM
             END DO
         END IF
C
       END DO
C
       IF   ( M(ROWS,COLS) .EQ. 0.0 ) M(ROWS,COLS) = TINY
C
       RETURN
       END
C
C_____
C
       SUBROUTINE MATLUB ( M, ROWS, COLS, INDX, BCK )
C
C_____
C
C
C      NAME:    MATLUB
C
C      FUNCTION:  Lower/Upper (LU) decomposed matrix backsubstitution
C
C      DESCRIPTION:
C            If the input matrix is not square Then
C               Write status message to the user.
C                Exit from the program.
C            End if input matrix is not square.
C            Perform the backsubstitution.
C
C      REFERENCES:
C
C
C_____
C
C      CALLING SEQUENCE:
C           CALL MATLUB ( M, ROWS, COLS, INDX, BCK )
C
C      INPUTS:
C
C         M              - Input matrix
C         ROWS, COLS     - Matrix dimensions
C
```

```
C     OUTPUTS:
C
C        M         - LU decomposition of the input matrix
C        INDX      - Backsubstitution index vector
C        BCK       - Backsubstitution vector for current row
C
C     DEPENDENCIES:
C        EXIT      - System exit routine
C
C     SIDE EFFECTS:
C        The input matrix must be an LU decomposed matrix.
C
C     TARGET PROCESSOR:
C        VAX 8000 series VMS 4.5, Fortran Compiler 4.5-219
C
C     HISTORY:
C        02/18/91   D. Van Rheeden    Initial Release
C
C_____
C
C     Local Variables
C
C        I, J    Matrix/vector indexes
C        II      Nonzero backsubstitution sum index
C        IP      Pointer into the INDX vector
C        SUM     Intermediate sum
C
C_____
C
C     Variable Declarations
C
      IMPLICIT NONE
C
      INTEGER*2  COLS, I, II, IP, INDX(50), J, ROWS
C
      REAL*4     BCK(50), M(ROWS,COLS), SUM
C
C_____
C
C                   EXECUTABLE CODE                                    *
C                                                                      *
C_____
C
C     If the input matrix is not square then write a status message and
C     exit the program.
C
      IF ( ROWS .NE. COLS ) THEN
         WRITE (6,*) ' Error in MATLUB... ',
     &   ' Cannot do backsubstitution on a nonsquare matrix. '
         CALL EXIT (0)
      END IF
C
C     Perform the backsubstitution.
C
      II = 0
```

```
C
      DO I = 1, ROWS
        IP = INDX(I)
        SUM = BCK(IP)
        BCK(IP) = BCK(I)
        IF ( II .NE. 0 ) THEN
          DO J. = II, I-1
            SUM = SUM - M(I,J) * BCK(J)
          END DO
        ELSE IF ( SUM .NE. 0.0 ) THEN
          II = I
        END IF
        BCK(I) = SUM
      END DO
C
      DO I = ROWS, 1, -1
        SUM = BCK(I)
        IF ( I .LT. ROWS ) THEN
          DO J = I+1, COLS
            SUM = SUM - M(I,J) * BCK(J)
          END DO
        END IF
        BCK(I) = SUM / M(I,I)
      END DO
C
      RETURN
      END
C_____
C
C                Texas Instruments
C                 TI INTERNAL DATA
C           Property of Texas Instruments ONLY
C_____
C
      SUBROUTINE VECADD ( V1, V2, SUM, COLS )
C
C_____
C
C  NAME:  VECADD
C
C  FUNCTION:    Adds two vectors.
C
C  DESCRIPTION:
C       Sum = vector #1 + vector #2.
C
C  REFERENCES:
C
C_____
C
C  CALLING SEQUENCE:
C       CALL VECADD ( V1, V2, SUM, COLS )
C
C  INPUTS:
C       V1, V2  - Input vectors
C       COLS    - Vector dimensions
C
```

```
C     OUTPUTS
C        SUM       - Output vector sum
C
C     DEPENDENCIES:
C        None
C
C     SIDE EFFECTS:
C        None
C
C     TARGET PROCESSOR:
C        VAX 8000 series VMS 4.5, Fortran Compiler 4.5-219
C
C     HISTORY:
C
C        02/18/91   D. Van Rheeden   Initial Release
C
C_____
C
C     Local Variables
C
C        I   -       Vector index
C
C_____
C
C     Variable Declarations
C
      IMPLICIT NONE
C
      INTEGER*2      COLS, I
C
      REAL*4         V1(COLS), V2(COLS), SUM(COLS)
C_____
C
C                    EXECUTABLE CODE
C
C_____
C
C     Add the two input vectors.
C
      DO I = 1, COLS
        SUM(I) = V1(I) + V2(I)
      END DO
C
      RETURN
      END
C
C_____
C
      SUBROUTINE VECSUB ( V1, V2, DIFF, COLS )
C
C_____
C
C     NAME:     VECSUB
C
C     FUNCTION:   Subtracts two vectors.
C
```

```
C      DESCRIPTION:
C          Difference = vector #1 - vector #2.
C
C      REFERENCES:
C
C
C_____
C
C      CALLING SEQUENCE:
C          CALL VECSUB ( V1, V2, DIFF, COLS)
C
C      INPUTS:
C          V1, V2  - Input vectors
C          COLS    - Vector dimensions
C
C      OUTPUTS:
C          DIFF    - Output vector difference
C
C      DEPENDENCIES:
C          None
C
C      SIDE EFFECTS:
C          None
C
C      TARGET PROCESSOR:
C          VAX 8000 series VMS 4.5, Fortran Compiler 4.5-219C
C
C      HISTORY:
C          02/18/91   D. Van Rheeden   Initial Release
C
C      Local Variables
C
C                  Vector index
C
C_____
C
C      Variable Declarations
C
       IMPLICIT NONE
C
       INTEGER*2         COLS, I
C
       REAL*4            V1(COLS), V2(COLS), DIFF(COLS)
C
C_____
C
C                        EXECUTABLE CODE                        *
C                                                               *
C_____ *
C
C      Subtract the two input vectors.
C
       DO I = 1, COLS
           DIFF(I) = V1(I) - V2(I)
       END DO
C
       RETURN
       END
C
C_____
```

```
C
        SUBROUTINE VECMULT ( V1, V2, PROD, COL1, COL2 )
C
C_____

C     NAME:      VECMULT
C
C     FUNCTION:  Multiplies two vectors to give the inner product.
C
C     DESCRIPTION:
C         If inner vector dimensions do not match Then
C             Write status message to the user.
C             Exit from the program.
C         End if inner vector dimensions do not match.
C         Inner product = vector #1 (transposed) * vector #2.
C
C     REFERENCES:
C
C_____
C
C     CALLING SEQUENCE:
C         CALL VECMULT ( V1, V2, PROD, COL1, COL2)
C
C     INPUTS:
C         V1, V2  - Input vectors
C         COL1    - Input vector V1 dimensions
C         COL2    - Input vector V2 dimensions
C
C     OUTPUTS:
C         PROD    - Output vector inner product
C
C     DEPENDENCIES:
C         EXIT    - System exit routine
C
C     SIDE EFFECTS:
C         None
C
C     TARGET PROCESSOR:
C         VAX 8000 series VMS 4.5, Fortran Compiler 4.5-219
C
C     HISTORY:
C         02/18/91   D. Van Rheeden   Initial Release
C
C_____

C     Local Variables
C
C         I            Vector index
C
C_____

C     Variable Declarations
C
          IMPLICIT NONE
C
          INTEGER*2    COL1, COL2, I
C
          REAL*4       V1(COL1), V2(COL2), PROD
```

```
C
C_____
C
C                        EXECUTABLE CODE                                *
C                                                                       *
C_____
C
C  If the vector dimensions do not agree, write a status message
C  and exit the program.
C
         IF ( COL1 .NE. COL2 ) THEN
            WRITE (6,*) ' Error in VECMULT... ',
     &         ' Vector dimensions do not agree. '
            CALL EXIT (0)
         END IF
C
C     Multiply the two input vectors.
C
         PROD = 0.0
         DO I = 1, COL1
            PROD = PROD + V1(I) * V2(I)
         END DO
C
         RETURN
         END
C
C
C_____
C
         SUBROUTINE MVMULT ( M, V, PROD, ROW1, COL1, COL2 )
C
C_____

C     NAME:    MVMULT
C
C     FUNCTION:     Multiplies a matrix by a vector.
C
C     DESCRIPTION:
C            If matrix column dimension does not match vector
C            dimension Then
C            Write status message to the user.
C            Exit from the program.
C            End if dimensions do not match.
C            Product = matrix * vector.
C
C     REFERENCES:
C
C_____

C     CALLING SEQUENCE:
C          CALL MVMULT ( M, V, PROD, ROW1, COL1, COL2 )
C     INPUTS:
C          M            - Input matrix
C          V            - Input vector
C          ROW1, COL1   - Input matrix M dimensions
C          COL2         - Input vector V dimensions
```

```
C
C      OUTPUTS:
C           PROD    - Output vector = M * V
C
C      DEPENDENCIES:
C           EXIT    - System exit routine
C
C      SIDE EFFECTS:
C           None
C
C      TARGET PROCESSOR:
C           VAX 8000 series VMS 4.5, Fortran Compiler 4.5-219
C
C      HISTORY:
C           02/18/91   D. Van Rheeden   Initial Release
C
C_____
C
C      Local Variables
C
C           I, J         Matrix/vector index
C           SUM          Product accumulator
C
C_____
C
C      Variable Declarations
C
       IMPLICIT NONE
C
       INTEGER*2    COL1, COL2, I, J, ROW1
C
       REAL*4       M(ROW1,COL1), V(COL2), PROD(ROW1), SUM
C
C_____
C
C                      EXECUTABLE CODE
C
C_____
C
C      If the matrix column dimension do not match the vector
C      dimension, write a status message and exit the program.
C
C
       IF ( COL1 .NE. COL2 ) THEN
          WRITE (6,*) ' Error in MVMULT... ',
     &    ' Matrix column and vector dimensions do not agree. '
          CALL EXIT (0)
       END IF
C
C      Multiply the input matrix by the input vector.
C
       DO I = 1, ROW1
          SUM = 0.0
          DO J = 1, COL1
             SUM = SUM + M(I,J) * V(J)
          END DO
          PROD(I) = SUM
       END DO
```

```
C           RETURN
            END
C
C
C
C_____
C
            SUBROUTINE VMMULT ( V, M, PROD, ROW1, ROW2, COL2 )
C
C_____
C
C     NAME:    VMMULT
C
C     FUNCTION:     Multiplies a vector by a matrix.
C
C     DESCRIPTION:
C          If vector dimension does not match matrix row dimension C Then
C               Write status message to the user.
C               Exit from the program.
C          End if dimensions do not match.
C          Product = vector * matrix.
C
C     REFERENCES:
C
C_____
C
C     CALLING SEQUENCE:
C          CALL VMMULT ( V, M, PROD, ROW1, ROW2, COL2 )
C
C     INPUTS:
C          V              -    Input vector
C          M              -    Input matrix
C          ROW1           -    Input vector V dimension
C          ROW 2, COL2    -    Input matrix M dimensions
C
C     OUTPUTS:
C          PROD   - Output vector = V^T * M
C
C     DEPENDENCIES:
C          EXIT   - System exit routine
C
C     SIDE EFFECTS:
C          None
C
C     TARGET PROCESSOR:
C          VAX 8000 series VMS 4.5, Fortran Compiler 4.5-219
C
C     HISTORY:
C          02/18/91   D. Van Rheeden   Initial Release
C
C_____
C
C     Local Variables
C
C          I, J        Matrix/vector indexes
C          SUM         Product accumulator
C
C_____
C
C     Variable Declarations
```

```
C       IMPLICIT NONE
C
        INTEGER*2    COL2, I, J, ROW1, ROW2
C
        REAL*4       V(ROW1), M(ROW2,COL2), PROD(COL2), SUM
C_____
C                                                            *
C                    EXECUTABLE CODE                         *
C                                                            *
C_____
C
C       If the vector dimension does not match the matrix row C dimension, then write a status
C       message and exit the program.
C
C
C
        IF ( ROW1 .NE. ROW2 ) THEN
            WRITE (6,*) ' Error in VMMULT... '
    &       'Vector dimension does not agree with matrix" row dimension.'
            CALL EXIT (0)
        END IF
C
C       Multiply the input vector by the input matrix.
C
        DO J = 1, COL2
            SUM = 0.0
            DO I = 1, ROW1
                SUM = SUM + V(I) * M(I,J)
            END DO
C
            PROD(J) = SUM
        END DO
C
        RETURN
        END
```

Although the present invention and its advantages have been described in detail, it should be understood that various changes, substitutions and alterations can be made herein without departing from the spirit and scope of the invention as defined by the appended claims.

What is claimed is:

1. A method for rejecting subimages associated with an aimpoint comprising the steps of:
   determining the location of a set of subimages associated with an aimpoint at a first time;
   estimating the location of the aimpoint based on the location of the set of subimages at the first time and on a geometric relationship between the subimages and the aimpoint at a second time prior to the first time;
   estimating a set of locations of the subimages, each estimated location based on the estimated aimpoint at the first time;
   setting a displacement threshold;
   calculating a difference between each estimated subimage location and the corresponding measured location; and
   rejecting each subimage whose difference exceeds the displacement threshold.

2. The method of claim 1 and further comprising the step of recalculating the location of the aimpoint based on all of the remaining subimages of the certain set.

3. The method of claim 2 wherein the recalculated location of the aimpoint is calculated using a least squares technique.

4. The method of claim 1 wherein the difference is a T-test.

5. A method for tracking an aimpoint comprising the steps of:
   acquiring an aimpoint and a set of subimages arbitrarily associated with the aimpoint at a first time;
   calculating the normalized distance from each subimage to the aimpoint;
   at a later time reacquiring at least one of the subimages;
   estimating a subsequent location of the aimpoint based on the later subimages and on the normalized distances;
   setting a displacement threshold;
   estimating a set of locations of the subimage based on the subsequent location of the aimpoint and on the normalized distances;
   calculating the difference between the estimated location and the reacquired location of each subimage;
   rejecting each subimage whose difference exceeds the displacement threshold; and
   reestimating the aimpoint based on the remaining later subimages.

6. The method of claim 5 wherein the difference is a T-test.

7. The method of claim 5 wherein the estimated and reestimated location of the aimpoint is determined using a least squares technique.

8. A method for tracking an aimpoint on a target comprising the steps of:
   at a first time acquiring an aimpoint on the target and a set of subimages associated with the aimpoint using a sensor operable to change its displacement relative to the aimpoint;

calculating the normalized distance from each subimage to the aimpoint;

reacquiring at least one of the subimages at a second time using the sensor;

estimating the location of the aimpoint at a second time based on the subimages at the second time;

estimating a set of locations of the subimages at the second time, each location based on estimated location of the aimpoint at the second time and the normalized distances;

setting a displacement threshold value applicable to each subimage;

determining a difference between the estimated location and the reacquired position of each subimage;

rejecting each subimage whose difference exceeds the displacement threshold;

reestimating the location of the aimpoint based on the remaining subimages; and changing the displacement of the sensor relative to the target in accordance with the reestimated location of the aimpoint.

9. The method of claim 8 wherein the difference is a T-test.

10. The method of claim 9 wherein the estimated and reestimated locations of the aimpoint are determined with a least squares technique.

11. The method of claim 8 wherein the estimated and reestimated locations of the aimpoint are determined with a least squares technique.

12. A guidance system for tracking an aimpoint, the guidance system comprising:

an aimpoint designator for establishing an aimpoint on a target;

a sensor for periodically acquiring a set of subimages arbitrarily associated with the aimpoint;

a normalized distance calculator responsive to the aimpoint designator and the sensor for calculating the distance between each subimage from a first set of subimages and from the established aimpoint;

a processor coupled to the aimpoint designator, the sensor and the normalized distance calculator for periodically estimating and reestimating the subsequent location of the aimpoint and for estimating the subsequent location of a set of subimages, the estimated location of the aimpoint based upon a set of periodically acquired subimages and on the calculated normalized distances, and the reestimated aimpoint based upon a subset of the set of subimages and upon the normalized distances, and the location of the set of subimages based upon the calculated normalized distances and upon the estimated aimpoint;

a comparator coupled to the processor for calculating a difference between the location of the periodically acquired subimages and of the estimated subimages and for creating the subset of the subimages, the subset of subimages comprising those subimages whose difference does not exceed a threshold; and memory coupled to the processor for storing the normalized distances.

13. The guidance system of claim 12, further comprising a control system for moving the sensor towards each of the subsequent locations of the aimpoint.

14. A missile comprising:

an aimpoint designator for establishing an aimpoint on a target;

a sensor for periodically acquiring a set of subimages arbitrarily associated with the aimpoint;

a normalized distance calculator responsive to the aimpoint designator and the sensor for calculating the distance between each subimage from a first set of subimages and from the established aimpoint;

a processor coupled to the aimpoint designator, the sensor and the normalized distance calculator for periodically estimating and reestimating the subsequent location of the aimpoint and for estimating the location of a set of subimages, the estimated location of the aimpoint based upon a set of periodically acquired subimages and on the calculated normalized distances, the reestimated aimpoint based upon a subset of the set of subimages and upon the normalized distances, and the location of the set of subimages based upon the calculated normalized distances and upon the estimated aimpoint; and a comparator coupled to the processor for calculating a difference between the location of the periodically acquired subimages and of the estimated & subimages and for creating the subset of the subimages, the subset of subimages comprising those subimages whose difference did not exceed a threshold;

memory coupled to the processor for storing the normalized distances;

fins for guiding the missile responsive to the reestimated aimpoints; and a motor for propelling the missile.

* * * * *